(12) United States Patent
Snyder

(10) Patent No.: US 11,187,477 B2
(45) Date of Patent: Nov. 30, 2021

(54) MAGNETIC SHOCK ABSORBING BUFFER

(71) Applicant: Bradley W. Snyder, Chesapeake, VA (US)

(72) Inventor: Bradley W. Snyder, Chesapeake, VA (US)

( * ) Notice: Subject to any disclaimer, the term of this patent is extended or adjusted under 35 U.S.C. 154(b) by 0 days.

(21) Appl. No.: 17/105,973

(22) Filed: Nov. 27, 2020

(65) Prior Publication Data
US 2021/0164742 A1 Jun. 3, 2021

Related U.S. Application Data

(60) Provisional application No. 62/941,998, filed on Nov. 29, 2019.

(51) Int. Cl.
*F41A 3/78* (2006.01)
*F16F 15/03* (2006.01)

(52) U.S. Cl.
CPC .............. *F41A 3/78* (2013.01); *F16F 15/03* (2013.01); *F16F 2222/06* (2013.01)

(58) Field of Classification Search
CPC ...... F41A 3/84; F41A 3/78; F41A 3/80; F41A 3/82; F41A 3/86; F16F 15/03; F16F 2222/06
See application file for complete search history.

(56) References Cited

U.S. PATENT DOCUMENTS

| | | | |
|---|---|---|---|
| 3,492,749 A * | 2/1970 | Vironda | F41C 23/06 42/74 |
| 6,668,478 B2 * | 12/2003 | Bergstrom | F41A 3/92 42/1.06 |
| 6,684,549 B2 * | 2/2004 | Bragg | F41C 23/08 42/74 |
| 6,901,689 B1 * | 6/2005 | Bergstrom | F41A 3/92 42/1.06 |
| 8,042,296 B1 | 10/2011 | Kirstein | |
| 8,176,668 B2 | 5/2012 | Simms et al. | |
| 9,448,028 B2 | 9/2016 | Panzanaro | |
| 10,054,378 B2 * | 8/2018 | Pawlowski | F41A 3/84 |
| 10,088,266 B1 | 10/2018 | Fournerat | |
| 2002/0178901 A1 * | 12/2002 | Bergstrom | F41A 3/94 89/198 |
| 2006/0048637 A1 * | 3/2006 | Dimitrios | F41A 3/86 89/14.3 |

(Continued)

*Primary Examiner* — Joshua E Freeman
(74) *Attorney, Agent, or Firm* — Shaddock Law Group, PC

(57) ABSTRACT

A magnetic shock absorbing buffer system having a buffer element with a buffer element cavity having internal buffer threads and a buffer cavity shoulder; a plunger element having a plunger head that is slidable within the buffer element cavity, wherein a plunger body extends through the buffer cavity second open end, and wherein a plunger shoulder contacts the buffer cavity shoulder to maintain the plunger head within the buffer element cavity; an adjustment screw, wherein external adjustment screw threads interact with the internal buffer threads to allow the adjustment screw to be adjustably positioned within the buffer cavity; and at least one dynamic magnet and at least one static magnet positioned within the buffer cavity, wherein like poles face one another such that the magnets act to repel one another within the buffer cavity, and wherein the adjustment screw maintains the magnets within the buffer cavity.

20 Claims, 15 Drawing Sheets

(56) References Cited

U.S. PATENT DOCUMENTS

| | | |
|---|---|---|
| 2009/0126559 A1 | 5/2009 | Mantas |
| 2014/0059909 A1* | 3/2014 | Caudle .................... F41A 3/84 |
| | | 42/1.06 |
| 2018/0328682 A1* | 11/2018 | Myers ...................... F41A 3/84 |
| 2019/0017765 A1* | 1/2019 | Bender ................... F41A 19/04 |
| 2021/0102768 A1* | 4/2021 | Perez ....................... F41A 3/78 |

* cited by examiner

MAGNETIC SHOCK ABSORBING BUFFER

CROSS-REFERENCE TO RELATED APPLICATIONS

This patent application claims the benefit of U.S. Patent Application Ser. No. 62/941,998, filed Nov. 29, 2019, the disclosure of which is incorporated herein by reference in its entirety.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE INVENTION

1. Field of the Invention

The present disclosure relates generally to recoil buffers or shock absorbers. More specifically, the present disclosure relates to a magnetic shock absorbing buffer system and firearm bolt assembly reciprocation, mechanical spring guidance, and recoil management.

2. Description of Related Art

The AR-15 is based on the AR-10, which was designed by Eugene Stoner, Robert Fremont, and L. James Sullivan of the Fairchild ArmaLite Corporation in 1957. Today, there are numerous variants of the AR-15 that are manufactured by a number of companies. The AR-15 and its various related derivative platforms are used by civilians, law enforcement personnel, and military forces around the world.

Various firearms, such as, for example, the AR-15 or M-4 style firearms utilize a variable position buttstock 2 that is slidable and lockable at various positions along a buffer tube 5. A typical variable position buttstock 2 can be locked into a collapsed position or locked into a fully extended position, as illustrated in FIG. 1.

As further illustrated in FIGS. 2 and 3, the typical buffer tube 2 includes a capped cylindrical portion having a threaded portion 8 for installation into a buffer tube receiving aperture 11 of a lower receiver 10. Typically, an endplate 6 and a lock ring 4 are utilized to complete installation of the buffer tube 5 on the receiver. A key protrusion 7 extends from the cylindrical portion 9, typically at the 6 o'clock position. An interior portion of the key protrusion includes a plurality of spaced apart recesses or apertures that interact with a retractable bolt to lock the buttstock 2 in a desired position relative to the buffer tube 5.

During normal operation of a semiautomatic AR-15 style rifle, when a round is fired, gas from the burning propellant forces the bullet through the barrel. Before the bullet leaves the barrel, a portion of the gas enters a gas port in the upper part of the barrel under the front sight (or gas block). The gas port directs gas through a portion of the front sight (or gas block) and into the gas tube, which directs the gas into a cylinder between the bolt carrier and the bolt and drives the bolt carrier rearward.

The buffer 3, which is pushing on the rear of the bolt carrier group, is forced rearward by the bolt carrier group, compressing the recoil spring 1. During this rearward movement, a cam track in the upper portion of the bolt carrier acts on the bolt cam pin, rotating the cam pin and bolt clockwise so that the bolt locking lugs are unlocked from the barrel extension locking lugs. As the rearward movement of the bolt carrier group continues, the empty cartridge case is extracted from the chamber, and ejected through the ejection port.

As the bolt carrier group clears the top of an inserted magazine and the empty cartridge case is expelled, a new round is pushed into the path of the bolt by the upward thrust of the magazine follower and spring.

As the bolt carrier group continues to move rearward, it overrides the hammer and forces the hammer down into the receiver, compressing the hammer spring, and allowing the rear hook of the hammer to engage with the hammer disconnect.

When the bolt carrier group reaches its rearmost position (when the rear of the buffer 3 contacts the bottom wall at the rear of the buffer tube 5), the compressed recoil spring 1 expands, driving the buffer assembly forward with enough force to drive the bolt carrier group forward, toward the chamber, initiating chambering of the waiting round from the magazine into the chamber.

The forward movement of the bolt ceases when the locking lugs pass between the barrel extension locking lugs and the round is fully chambered. When the bolt carrier enters the final portion of its forward movement, the bolt cam pin emerges from the cam pin guide channel in the upper receiver and moves along the cam track, rotating the bolt counterclockwise. This rotation locks the bolt to the barrel extension (by interaction of the bolt locking lugs and the barrel extension locking lugs). The locking of the bolt completes the cycle of operation and, when the trigger is released, the rear hammer hook hammer slips from the disconnect and the front hammer hook is caught by the sear of the trigger. The firearm is then ready to be fired again.

Typical firearms possess a buffer with a static weight and solid construction that serves to prevent the binding of the recoil spring that facilitates the back-and-forth movement of a bolt group or action.

Some buffers, having internal weights to change the velocity of the reciprocating mass of the action, are not easily serviceable by users. They require special tools as well as removal of the buffer from the firearm in order to change these weights.

Upon the farthest rearward operation of the firearm action, these buffers impact the back of the buffer tube or receiver and impart a recoil impulse into the user equal to their mass and velocity at that point.

Present industry solutions solve this problem by replacing either the entire buffer and spring assembly with a captured buffer and multiple springs, or by supplementing a buffer with hydraulic or mechanical spring assisted devices that lack the ability of a user to adjust both the weight and tension without special tools or removing the devices from the firearm.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE INVENTION

Unfortunately, the typical the typical firearm buffer includes a static weight and solid construction that serves to prevent the binding of the recoil spring that facilitates the back-and-forth movement of a bolt group or action.

Some buffers, having internal weights to change the velocity of the reciprocating mass of the action, are not easily serviceable by users. They require special tools as well as removal of the buffer from the firearm in order to change these weights.

Upon the farthest rearward operation of the firearm action, these buffers impact the back of the buffer tube or receiver and impart a recoil impulse into the user equal to their mass and velocity at that point.

Present industry solutions solve this problem by replacing either the entire buffer and spring assembly with a captured buffer and multiple springs, or by supplementing a buffer with hydraulic or mechanical spring assisted devices that lack the ability of a user to adjust both the weight and tension without special tools or removing the devices from the firearm.

The disadvantages and shortcomings of the prior art are overcome by the features and elements of the magnetic shock absorbing buffer system of the present disclosure. The advantages of the present disclosure are preferably attained by providing, in an exemplary, nonlimiting embodiment, a repelling magnet powered shock absorbing plunger proximate the rear of the shock absorbing buffer of the present disclosure, and allowing a user to adjust the tension and weight of the device without having to remove the magnetic shock absorbing buffer from the firearm.

In various exemplary, nonlimiting embodiments, the magnetic shock absorbing buffer system provides an improved solution to the typical firearm buffer by adding a repelling magnet powered shock absorbing plunger to the rear of the buffer, and allowing a user to adjust the tension and weight of the device with US coinage or flathead driver without having to remove it from the firearm.

A compressible plunger protrudes from the rear of the magnetic shock absorbing buffer. In front of the plunger is a movable permanent magnet with a like pole facing an identical static permanent magnet in the front of the buffer. After triggering operation of the firearm, during rearward movement of the action, magnetic inductance creates an electromagnet braking effect between the metal alloy of the buffer tube and the magnets. This effect is stronger the faster the magnets are traveling, allowing this feature to self-regulate. Upon the rear plunger contacting the rear of the buffer tube or receiver, the plunger begins to compress into the body of the device. This progressively slows down the action over the remaining distance of travel, imparting a steadier shock dampening effect the further the device's rear plunger is compressed. The repulsion of the magnets still allows the action to move far enough back to operate the firearm action normally, but strong enough to not allow the magnets to fully compress and make contact. Consequently, the action does not experience any sudden stop or subsequent recoil impulse, thereby reducing the force imparted to the user as the action begins to operate forward, following the apex of rearward travel.

In various exemplary, nonlimiting embodiments, the magnetic shock absorbing buffer system can simply be swapped with normal buffer in typical firearms to easily decrease recoil felt by a user of the firearm system. Additional factors to consider as improvements to the normal buffer and other replacements are as follows.

The magnetic shock absorbing buffer system is disclosed and illustrated as being utilized in connection with (but not limited to) AR-15 and M16/M4 series of firearms. These platforms are highly modular, with features as caliber, bullet weight, ammunition propellant charge, system of operation (gas impingement, gas piston, blowback, etc.), barrel length, materials, and manufacturing standards varying in many examples. The weight of the action and buffer plays an important part in the physics that allow these firearms systems to operate correctly.

The nominal weight of the buffer in these AR series of firearms is approximately 3 ounces, but ideally must increase or decrease based on one or more variables listed above. Users of the normal buffer system must remove it from the firearm, possess uncommon tools to disassemble and reassemble the buffer, and procure additional weights separately.

The magnetic shock absorbing buffer system can be easily disassembled by removing the adjustment screw in the front of the magnetic shock absorbing buffer system, without having the remove it from the firearm. The buffer weight can then be changed by exchanging the aluminum plunger for one of a lighter polymer material or heavier copper-based alloy. The same can be done of the material the adjustment screw is made of. Other recoil mitigation systems do not offer the same modular changes without extra tooling, steps in assembly/disassembly, or outright having to purchase an entire replacement at the different weight desired.

The repulsion of the magnetic shock absorbing buffer system can be adjusted. The distance between the static magnet and the dynamic magnet can be changed by turning the same adjustment screw that retains the assembly. Turning the adjustment screw to the right will shorten the distance between the static magnet and the dynamic magnet and increase the repelling force, thereby allowing the magnetic shock absorbing buffer system to accommodate for variables in the speed of the action and better function under different conditions.

An advantage of utilizing powerful neodymium rare earth magnets is the particular response curve imparted to the plunger as it compresses. Fully extended, the plunger has approximately 1 inch of travel, and must be pressed with at least 10 ounces of force to begin moving. The force required to continue compression rises exponentially as the static magnet and the dynamic magnet move closer together, in such a way that cannot be reproduced by a spring system within the same design envelope. When compressed ½ inch (50%) there are 2 pounds of force, and at ¾ inches (75%) the force increases to 6 pounds. At over 90% plunger compression, the force climbs to over 10 pounds and finally over 20 pounds of force is needed to bottom out the plunger. (This amount of force is never reach under normal operating conditions, ensuring the magnetic shock absorbing buffer system never bottoms out, allowing the action a constant velocity).

As the magnetic shock absorbing buffer system moves inside of the recoil spring, the static magnet and the dynamic magnet pulling against it create a "magnetic friction braking" effect. The assembled magnetic shock absorbing buffer system does not readily eject air from inside of the buffer system assembly, supplementing a compressed air cushion within the buffer system assembly, which is stronger the faster the buffer is traveling when the plunger is initially engaged.

The magnetic shock absorbing buffer system separately and optionally provides an option to adjust the cyclic rate of fully automatic firearms, or "machine guns", by speeding up the forward reciprocation of the bolt group action.

In various exemplary, nonlimiting embodiments, a magnetic shock absorbing buffer system is provided that comprises at least some of a buffer element formed of a buffer element body portion and a buffer element head portion, wherein a buffer element cavity extends from a buffer cavity first open end to a buffer cavity second open end, wherein internal buffer threads are formed within a portion of said buffer cavity, extending from said buffer cavity first open end, and wherein a buffer cavity shoulder is formed proximate said buffer cavity second open end; a plunger element having a plunger head that extends from a plunger proximal end to a plunger shoulder and a plunger body that extends from said plunger shoulder to said plunger distal end, wherein said plunger head is slidable within at least a portion of said buffer element cavity, wherein said plunger body extends through said buffer cavity second open end, and wherein said plunger shoulder contacts or otherwise engages said buffer cavity shoulder to maintain said plunger head within said buffer element cavity; an adjustment screw that is at least partially externally threaded with external adjustment screw threads and extends to an adjustment screw abutment surface, wherein said external adjustment screw threads interact with said internal buffer threads to allow said adjustment screw to be adjustably positioned within said buffer cavity; and at least one dynamic magnet and at least one static magnet positioned within said buffer cavity, wherein said at least one dynamic magnet and said at least one static magnet are positioned within said buffer cavity such that like poles face one another such that said at him least one dynamic magnet and said at least one static magnet act to repel one another within said buffer cavity, and wherein said adjustment screw maintains said at least one dynamic magnet and said at least one static magnet within said buffer cavity.

In various exemplary, nonlimiting embodiments, said buffer body portion optionally comprises a generally cylindrical overall shape.

In various exemplary, nonlimiting embodiments, said buffer element cavity defined by one or more side walls.

In various exemplary, nonlimiting embodiments, said buffer cavity shoulder extends into at least a portion of said buffer cavity, such that said buffer cavity second open end has a reduced internal diameter when compared to an internal diameter of said buffer cavity first open end.

In various exemplary, nonlimiting embodiments, said adjustment screw comprises a threaded head plug.

In various exemplary, nonlimiting embodiments, said at least one dynamic magnet and said at least one static magnet are Rare Earth Neodymium designation N42 or higher.

In various exemplary, nonlimiting embodiments, said position of said adjustment screw relative to said buffer element cavity is adjustable to adjust a distance between said at least one dynamic magnet and said at least one static magnet within said buffer element cavity.

In various exemplary, nonlimiting embodiments, an anti-tilt cap is attached or coupled to said buffer element and extending from said buffer cavity first open end, wherein said anti-tilt cap extends from said buffer element so as to be at least partially received within at least a portion of a bolt carrier recess of a bolt carrier.

In various exemplary, nonlimiting embodiments, said buffer element head portion has a larger cross-sectional outer diameter than an outer cross-sectional diameter of said buffer element body portion.

In various exemplary, nonlimiting embodiments, a buffer shoulder is formed between said buffer element head portion and said buffer element body portion.

In various exemplary, nonlimiting embodiments, a magnetic shock absorbing buffer system is provided that comprises at least some of a buffer element having a buffer element cavity with internal buffer threads formed proximate a buffer cavity first open end and a buffer cavity shoulder formed proximate a buffer cavity second open end; a plunger element having a plunger head that extends from a plunger shoulder and a plunger body that extends from said plunger shoulder, wherein said plunger head is slidable within at least a portion of said buffer element cavity, wherein said plunger body extends through said buffer cavity second open end, and wherein said plunger shoulder contacts or otherwise engages said buffer cavity shoulder to maintain said plunger head within said buffer element cavity; an adjustment screw having external adjustment screw threads, wherein said external adjustment screw threads interact with said internal buffer threads to allow said adjustment screw to be adjustably positioned within a portion of said buffer cavity; and at least one dynamic magnet and at least one static magnet positioned within said buffer cavity, wherein like poles face one another such that said at least one dynamic magnet and said at least one static magnet act to repel one another within said buffer cavity, and wherein said adjustment screw maintains said at least one dynamic magnet and said at least one static magnet within said buffer cavity.

In various exemplary, nonlimiting embodiments, a magnetic shock absorbing buffer system is provided that comprises at least some of a buffer element extending from a buffer first end to a buffer second end, wherein a buffer element body portion extends from said buffer second end and a buffer element head portion extends from said buffer first end, wherein a buffer element cavity extends from a buffer cavity first open end to a buffer cavity second open end, wherein internal buffer threads are formed within a portion of said buffer cavity, extending from said buffer cavity first open end, and wherein a buffer cavity shoulder is formed proximate said buffer cavity second open end; a plunger element having a plunger head that extends from a plunger proximal end to a plunger shoulder and a plunger body that extends from said plunger shoulder to said plunger distal end, wherein said plunger head is slidable within at least a portion of said buffer element cavity, wherein said plunger body extends through said buffer cavity second open end, and wherein said plunger shoulder contacts or otherwise engages said buffer cavity shoulder to maintain said plunger head within said buffer element cavity; an adjustment screw that is at least partially externally threaded with external adjustment screw threads and extends to an adjustment screw abutment surface, wherein said external adjustment screw threads interact with said internal buffer threads to allow said adjustment screw to be adjustably positioned within said buffer cavity; and at least one dynamic magnet and at least one static magnet positioned within said buffer cavity, wherein said at least one dynamic magnet and said at least one static magnet are positioned within said buffer cavity such that like poles face one another such that said at him least one dynamic magnet and said at least one static magnet act to repel one another within said buffer cavity, and wherein said adjustment screw maintains said at least one dynamic magnet and said at least one static magnet within said buffer cavity.

Accordingly, the presently disclosed systems, methods, and/or apparatuses provide a magnetic shock absorbing buffer system that utilizes one or more magnets.

The presently disclosed systems, methods, and/or apparatuses separately and optionally provide a magnetic shock absorbing buffer system that provides recoil management.

The presently disclosed systems, methods, and/or apparatuses separately and optionally provide a magnetic shock absorbing buffer system that can be utilized in conjunction with a standard bolt carrier.

The presently disclosed systems, methods, and/or apparatuses separately and optionally provide a magnetic shock absorbing buffer system that allows a rifle operating system to be adjusted.

The presently disclosed systems, methods, and/or apparatuses separately and optionally provide a magnetic shock absorbing buffer system that can be easily adjusted by a user.

These and other aspects, features, and advantages of the present disclosure are described in or are apparent from the following detailed description of the exemplary, non-limiting embodiments of the present disclosure and the accompanying figures. Other aspects and features of embodiments of the present disclosure will become apparent to those of ordinary skill in the art upon reviewing the following description of specific, exemplary embodiments of the present disclosure in concert with the figures. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the systems, methods, and/or apparatuses discussed herein. In similar fashion, while exemplary embodiments may be discussed below as device, system, or method embodiments, it is to be understood that such exemplary embodiments can be implemented in various devices, systems, and methods of the present disclosure.

Any benefits, advantages, or solutions to problems that are described herein with regard to specific embodiments are not intended to be construed as a critical, required, or essential feature(s) or element(s) of the present disclosure or the claims.

BRIEF DESCRIPTION OF THE SEVERAL VIEWS OF THE DRAWINGS

As required, detailed exemplary embodiments of the present disclosure are disclosed herein; however, it is to be understood that the disclosed embodiments are merely exemplary of the systems, methods, and/or apparatuses that may be embodied in various and alternative forms, within the scope of the present disclosure. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the present disclosure.

The exemplary embodiments of the presently disclosed systems, methods, and/or apparatuses will be described in detail, with reference to the following figures, wherein like reference numerals refer to like parts throughout the several views, and wherein.

DETAILED DESCRIPTION OF THE INVENTION

Figure 1:
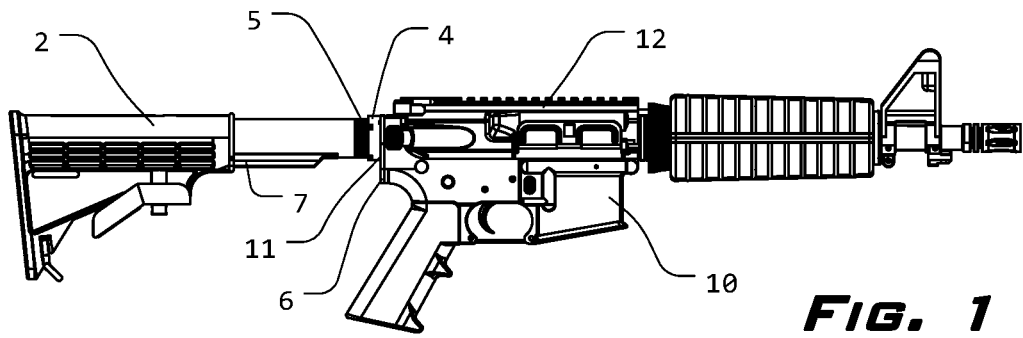
FIG. 1 illustrates a side view of a standard, AR-15 or M4 style rifle having a collapsible buttstock, shown in an extended position relative to a standard buffer tube.

For simplicity and clarification, the design factors and operating principles of the magnetic shock absorbing buffer system according to the presently disclosed systems, methods, and/or apparatuses are explained with reference to various exemplary embodiments of a magnetic shock absorbing buffer system according to the presently disclosed systems, methods, and/or apparatuses. The basic explanation of the design factors and operating principles of the magnetic shock absorbing buffer system is applicable for the understanding, design, and operation of the magnetic shock absorbing buffer system of the presently disclosed systems, methods, and/or apparatuses. It should be appreciated that the magnetic shock absorbing buffer system can be adapted to many applications where a magnetic shock absorbing buffer system or strap can be used.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the elements such terms describe. Thus, these terms are not necessarily intended to indicate temporal or other prioritization of such elements.

The term "coupled", as used herein, is defined as connected, although not necessarily directly, and not necessarily mechanically. The terms "a" and "an" are defined as one or more unless stated otherwise.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

It should also be appreciated that the terms "magnetic shock absorbing buffer system", "magnetic", "shock absorbing", and "buffer" are used for basic explanation and understanding of the operation of the presently disclosed systems, methods, and/or apparatuses. Therefore, the terms "magnetic shock absorbing buffer system", "magnetic", "shock absorbing", and "buffer" are not to be construed as limiting the systems, methods, and/or apparatuses of the present disclosure.

For simplicity and clarification, the magnetic shock absorbing buffer system of the present disclosure will be described as being used in conjunction with a firearm, such as an AR-15 or M4 style rifle or carbine. However, it should be appreciated that these are merely exemplary embodiments of the magnetic shock absorbing buffer system and are not to be construed as limiting the presently disclosed systems, methods, and/or apparatuses. Thus, the magnetic shock absorbing buffer system of the present disclosure may be utilized in conjunction with any firearm or rifle, such as, for example, an AR-10 style rifle, air rifle, paintball marker, Airsoft rifle, replica rifle, or any other tool, device, or object.

Figure 2:
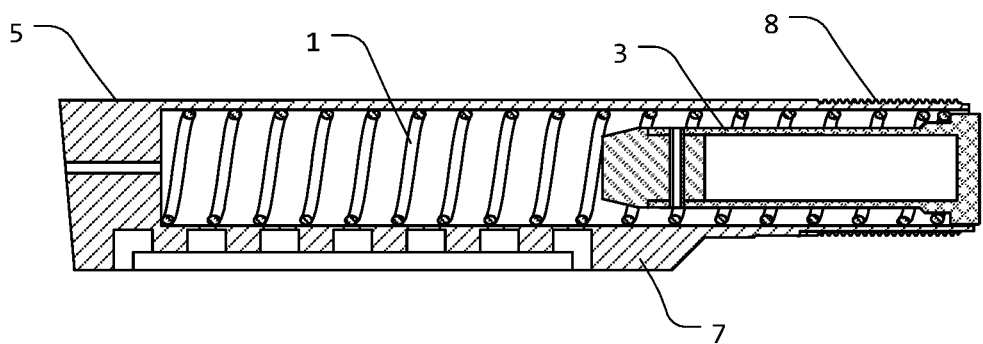
FIG. 2 illustrates a side, cross-sectional view of a standard buffer fitted within a standard buffer tube.
Figure 3:
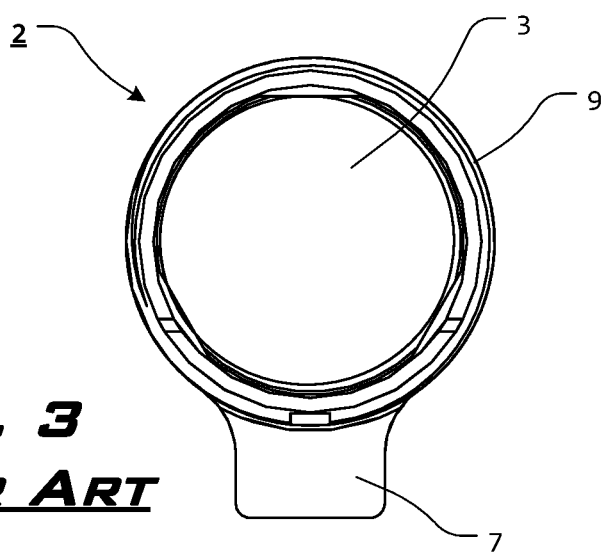
FIG. 3 illustrates a front view of a standard buffer fitted within a standard buffer tube.
Figure 4:
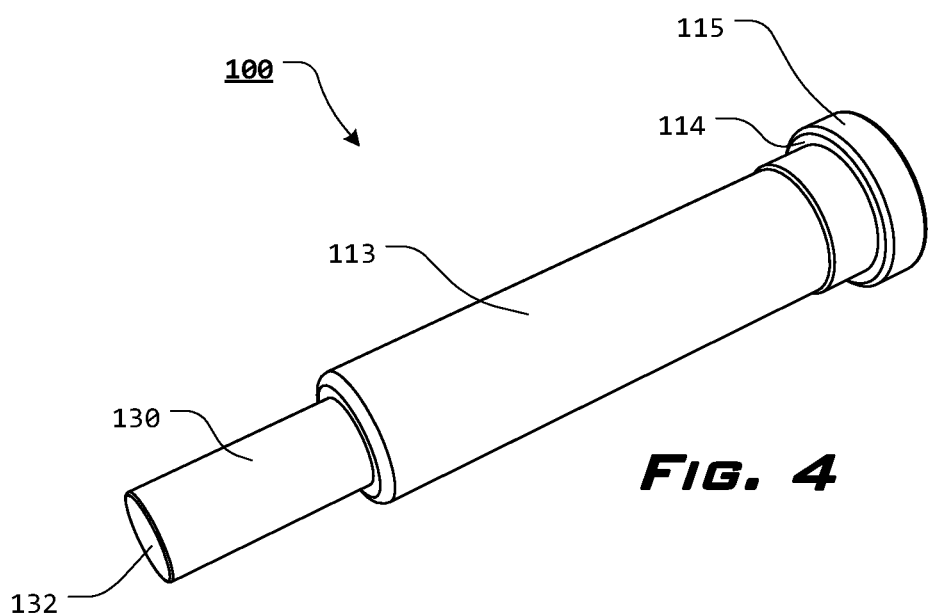
FIG. 4 illustrates an upper, rear, perspective view of an exemplary embodiment of a magnetic shock absorbing buffer system, according to the presently disclosed systems, methods, and/or apparatuses.
Figure 5:
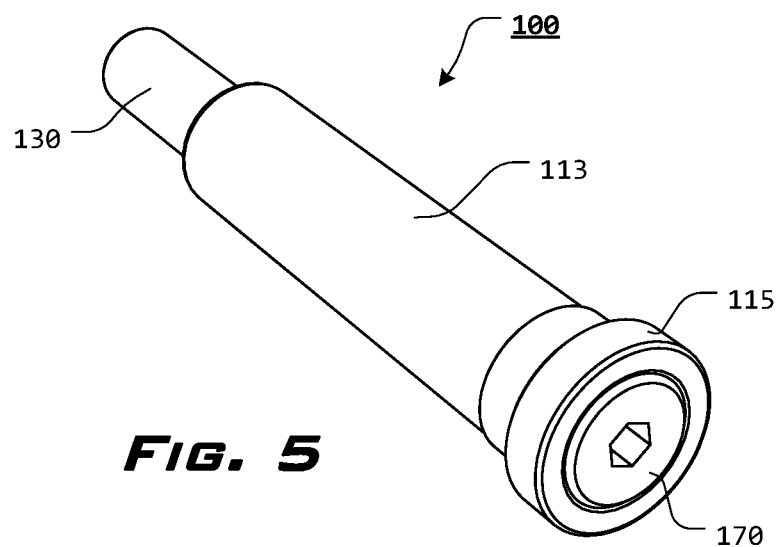
FIG. 5 illustrates an upper, front, perspective view of an exemplary embodiment of a magnetic shock absorbing buffer system, according to the presently disclosed systems, methods, and/or apparatuses.
Figure 6:
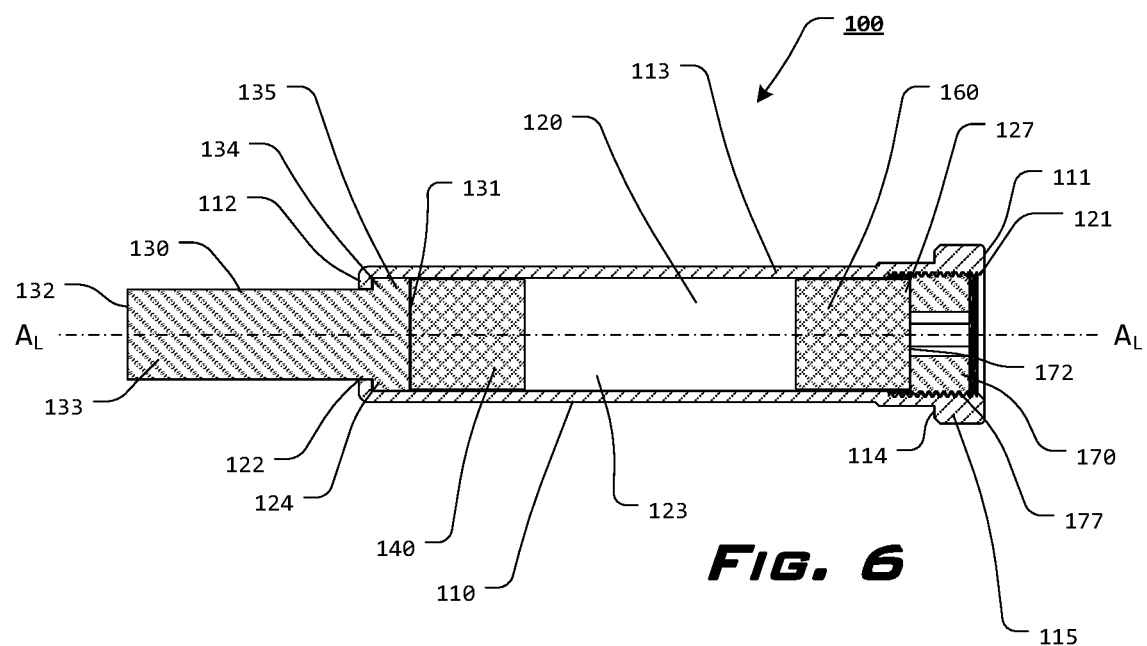
FIG. 6 illustrates a side, cross-sectional view of an exemplary embodiment of a magnetic shock absorbing buffer system, wherein the plunger element is in an extended position, according to the presently disclosed systems, methods, and/or apparatuses.
Figure 7:
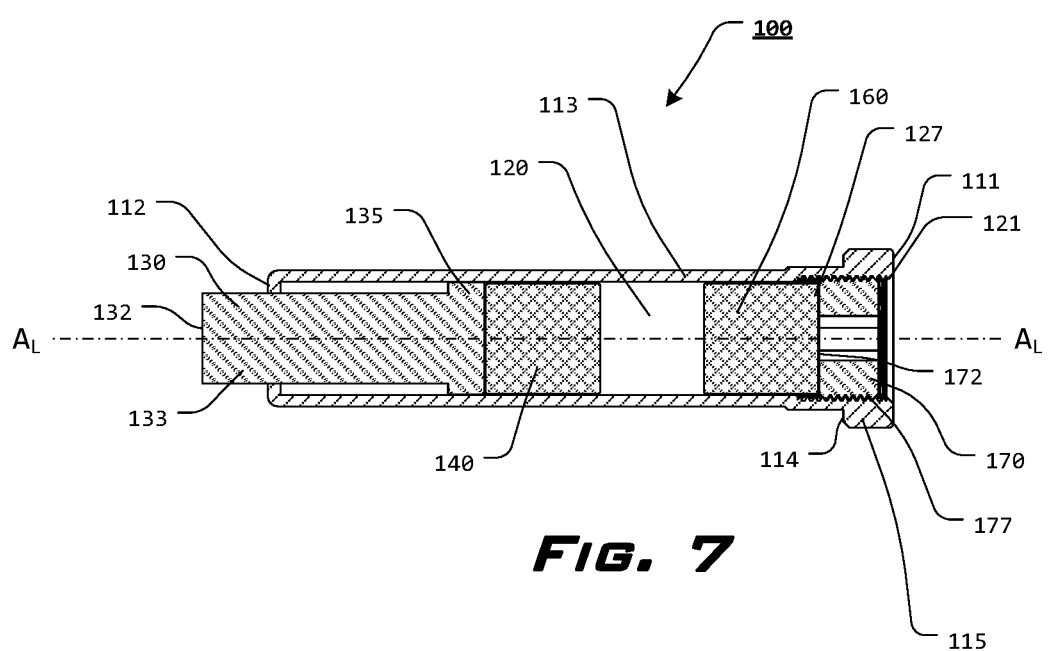
FIG. 7 illustrates a side, cross-sectional view of an exemplary embodiment of a magnetic shock absorbing buffer system, wherein the plunger element is in a retracted or partially retracted position, according to the presently disclosed systems, methods, and/or apparatuses.
Figure 8:
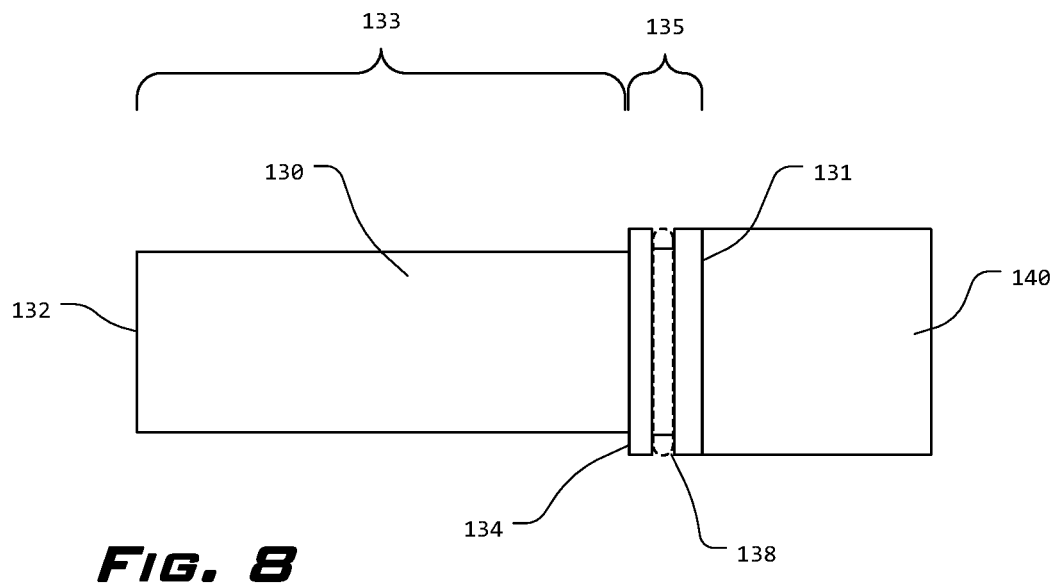
FIG. 8 illustrates a side view of an exemplary embodiment of a plunger element and dynamic magnet, according to the presently disclosed systems, methods, and/or apparatuses.
Figure 9:
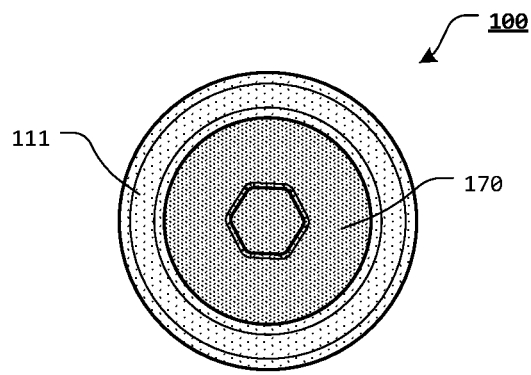
FIG. 9 illustrates a front view of an exemplary embodiment of a magnetic shock absorbing buffer system, according to the presently disclosed systems, methods, and/or apparatuses.
Figure 10:
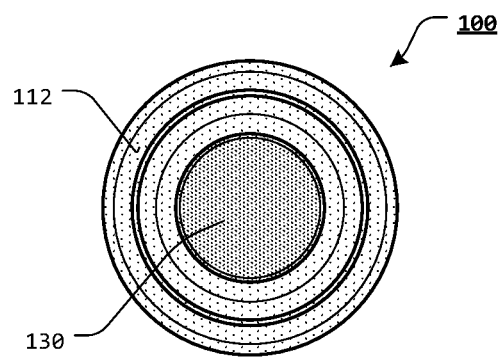
FIG. 10 illustrates a rear view of an exemplary embodiment of a magnetic shock absorbing buffer system, according to the presently disclosed systems, methods, and/or apparatuses.

Turning now to the drawing FIGS., as discussed above, FIG. 1-3 illustrate various components of known buffer tubes. FIGS. 4-32 illustrate certain elements and/or aspects of various exemplary embodiments of the magnetic shock absorbing buffer system 100, according to the presently disclosed systems, methods, and/or apparatuses. In illustrative, non-limiting embodiment(s) of the present disclosure, as illustrated in FIGS. 4-13, the magnetic shock absorbing buffer system 100 comprises at least some of a buffer element 110, a plunger element 130, one or more dynamic magnets 140, one or more static magnets 160, and an adjustment screw 170.

As illustrated most clearly in FIGS. 4-13, the buffer element 110 comprises an elongate portion of material extending, along a longitudinal axis $A_L$, from a buffer first end 111 to a buffer second end 112. The buffer element 110 is formed of a buffer element body portion 113 and a buffer element head 115. In various exemplary embodiments, the buffer element body portion 113 optionally comprises a generally cylindrical overall shape.

The buffer element 110 includes a buffer element cavity 120 defined by one or more buffer cavity side walls 123. The buffer element cavity 120 extends from a buffer cavity first open end 121, along the one or more buffer cavity side walls 123, to a buffer cavity second open end 122. Internal buffer threads 127 are formed within a portion of the buffer element cavity 120, extending from the buffer cavity first open end 121. The internal threading of each internal buffer threads 127 is formed so as to allow interaction between the internal buffer threads 127 and external adjustment screw threads 177 of an adjustment screw 170, such that the adjustment screw 170 can be repeatably threadedly rotated within the internal buffer threads 127 of the buffer element 110.

A buffer cavity shoulder 124 is formed proximate the buffer cavity second open end 122. The buffer cavity shoulder 124 extends into at least a portion of the buffer element cavity 120, such that the buffer cavity second open end 122 has a reduced internal diameter when compared to an internal diameter of the buffer cavity first open end 121. In this manner, the plunger body 133 of the plunger element 130 is able to be repeatedly, slidably movable within the buffer cavity second open end 122. However, while the plunger head 135 of the plunger element 130 is able to be repeatedly, slidably movable within the buffer element cavity 120, the plunger head 135 is enlarged, so as not to be able to be urged through the buffer cavity second open end 122. In various exemplary, nonlimiting embodiments, the buffer element 110 is formed of a partially or substantially solid portion of material and only includes a buffer element cavity 120 of a sufficient size to slidably accept the plunger head 135 therein.

The buffer element body portion 113 extends from the buffer second end 112 to a bulbous portion or buffer element head 115. The buffer element head 115 has a larger outer diameter than an outer diameter of the remainder of the buffer element body portion 113. A buffer shoulder 114 is formed as a transitional edge or plane between the buffer element head 115 and the outer surface of the buffer element body portion 113. The buffer element body portion 113 is formed such that at least a portion of the buffer element body portion 113 is positionable within a recoil spring 1. The buffer shoulder 114 extends from the buffer element body portion 113 so as to allow a terminal end of a recoil spring 1 to be abutted against the buffer shoulder 114.

In various exemplary embodiments, the buffer element 110 is substantially rigid and is formed of stainless steel. Alternate materials of construction of the buffer element 110 may include one or more of the following: steel, aluminum, titanium, and/or other metals, as well as various alloys and composites thereof. Thus, it should be understood that the material or materials used to form the buffer element 110 is a design choice based on the desired appearance and/or functionality of the buffer element 110.

As illustrated, the plunger element 130 comprises a portion of material extending, along a longitudinal axis $A_L$, from a plunger proximal end 131 to a plunger distal end 132. In various exemplary embodiments, a plunger head 135 extends rearward from the plunger proximal end 131. The plunger head 135 extends from the plunger proximal end 131 to a plunger shoulder 134. In various exemplary embodiments, the plunger shoulder 134 extends perpendicular to the longitudinal axis, $A_L$, of the plunger element 130. In various exemplary embodiments, the plunger head 135 optionally comprises a generally cylindrical overall shape.

The outer size and shape of the plunger head 135 is such that the plunger head 135 can be slidably fitted within the buffer element cavity 120 and positioned within at least a portion of the buffer element cavity 120.

A plunger body 133 extends rearward from the plunger shoulder 134 to the plunger distal end 132. In various exemplary embodiments, the plunger body 133 optionally comprises a generally cylindrical overall shape. The external diameter of the plunger body 133 is formed such that the plunger body 133 is capable of extending through the buffer cavity second open end 122 and the plunger shoulder 134 contacts or otherwise engages the buffer cavity shoulder 124.

In various exemplary embodiments, the plunger head 135 has a larger outer diameter or size than an outer diameter or size of the plunger body 133. Thus, the plunger shoulder 134 provides a transition between the plunger head 135 and the plunger body 133.

In various exemplary, nonlimiting embodiments, a plunger O-ring recess 138 may be formed within a portion of the plunger head 135. In these exemplary embodiments, an O-ring 139 may be positioned within the plunger O-ring recess 138 to provide frictional engagement between the O-ring 139 and the buffer cavity side wall 123 to increase frictional engagement between the plunger head 135 and the buffer cavity side wall 123. Additionally, the O-ring 139 may provide a seal between the plunger head 135 and the buffer element cavity 120 to prevent debris or liquid from entering the buffer element cavity 120. This also ensures containment of air and oil charge inside the buffer element cavity 120.

Figure 11:
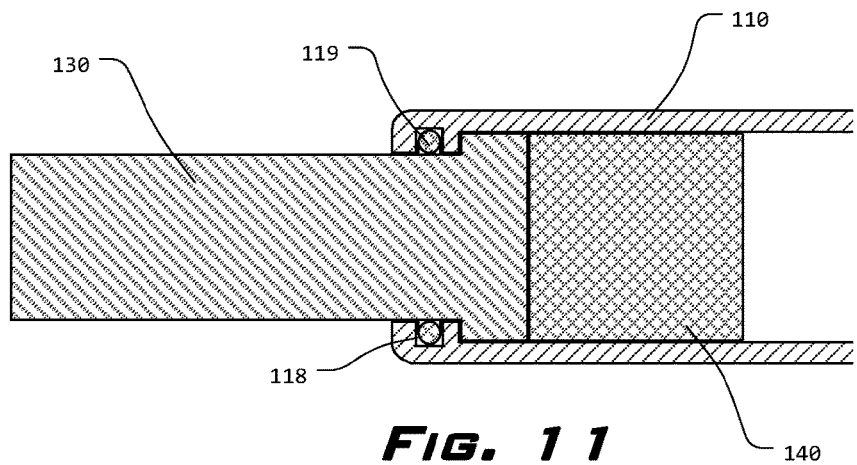
FIG. 11 illustrates a partial, cross-sectional view of an exemplary embodiment of a buffer element, according to the presently disclosed systems, methods, and/or apparatuses.
Figure 12:
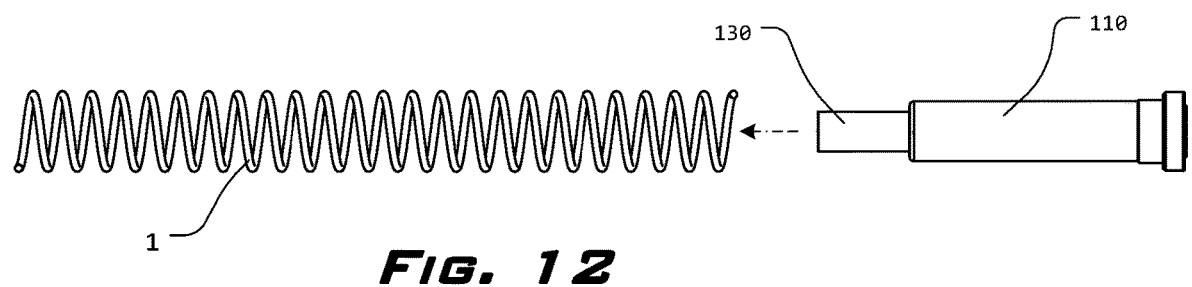
FIG. 12 illustrates a side view of an exemplary embodiment of a magnetic shock absorbing buffer system aligned with an exemplary recoil spring, according to the presently disclosed systems, methods, and/or apparatuses.
Figure 13:
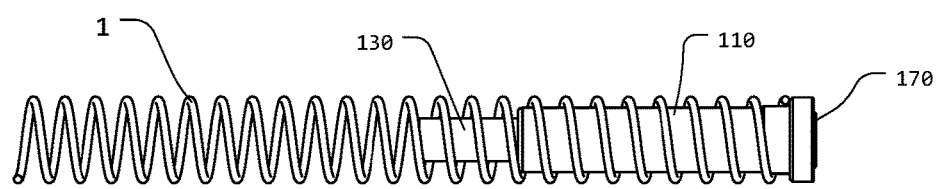
FIG. 13 illustrates a side view of an exemplary embodiment of a magnetic shock absorbing buffer system positioned within an exemplary recoil spring, according to the presently disclosed systems, methods, and/or apparatuses.

In certain exemplary embodiments, as illustrated most clearly in FIG. 11, a buffer O-ring recess 118 may be formed within a portion of the rearmost interior minor diameter of the buffer element body portion 113 so as to allow an O-ring 119 to be placed therein. In these exemplary embodiments, the O-ring 119 within the buffer O-ring recess 118 works to prevent debris or liquid from entering the buffer element cavity 120. This also ensures containment of air and oil charge inside the buffer element cavity 120.

The adjustment screw 170 is at least partially externally threaded with external adjustment screw threads 177 and extends to an adjustment screw abutment surface 172. In various exemplary embodiments, the adjustment screw 170 is similar to a threaded head plug. In various exemplary embodiments, each adjustment screw 170 comprises a hex head socket threaded plug. It should be appreciated that other threaded plugs may be utilized, having different sockets or features, which would allow, a hex key, Allen key, coin, Philips head screwdriver, flat blade screwdriver, or other similar device can be used to engage and rotate the adjustment screw 170.

In various exemplary, nonlimiting embodiments, the one or more dynamic magnets 140 and/or the one or more static magnets 160 are in the form of substantially cylindrical magnets. Alternatively, the one or more dynamic magnets 140 and/or the one or more static magnets 160 may have an octagonal or other cross-sectional shape. The one or more dynamic magnets 140 and/or the one or more static magnets 160 are formed so as to be positioned within the buffer element cavity 120.

The embodied magnets must be of particular strength, most preferably Rare Earth Neodymium designation N42 or higher (or equivalent) and as large as necessary to ensure they meet the design intention of absorbing recoil without the static magnet 160 and the dynamic magnet 140 touching or otherwise contacting one another.

During assembly of the magnetic shock absorbing buffer system 100, the plunger distal end 132 is urged through the buffer cavity first open end 121, such that the plunger body 133 extends through the buffer cavity second open end 122 and the plunger shoulder 134 contacts or otherwise engages the buffer cavity shoulder 124. The movable, or dynamic magnet 140 is positioned within the buffer element cavity 120 such that a terminal end of the dynamic magnet 140 contacts or otherwise engages the plunger proximal end 131. In various exemplary embodiments, the terminal end of the dynamic magnet 140 is not attached, coupled, or bonded to the plunger proximal end 131. Alternatively, the terminal end of the dynamic magnet 140 may be attached, coupled, or bonded to the plunger proximal end 131.

The static magnet 160 is then positioned within the buffer element cavity 120. It is important to note that the dynamic magnet 140 and static magnet 160 are positioned within the buffer element cavity 120 such that like poles (i.e., north poles or south poles) of the dynamic magnet 140 and the static magnet 160 face one another (i.e., the dynamic magnet 140 and static magnet 160 are positioned such that two north poles or two south poles are oriented toward each other) and the dynamic magnet 140 and static magnet 160 act to repel one another within the buffer element cavity 120.

Once the static magnet 160 is positioned within the buffer element cavity 120 the adjustment screw abutment surface 172 is positioned within the buffer element cavity 120. The adjustment screw 170 is rotated, relative to the buffer element body portion 113 such that interaction between the internal buffer threads 127 and the external adjustment screw threads 177 allows the adjustment screw 170 to be positioned within the buffer element cavity 120. Because the dynamic magnet 140 and the static magnet 160 repel one another within the buffer element cavity 120 a terminal end of the static magnet 160 is urged against the adjustment screw abutment surface 172. In various exemplary embodiments, the terminal end of the static magnet 160 is not attached, coupled, or bonded to the adjustment screw abutment surface 172. Alternatively, the terminal end of the static magnet 160 may be attached, coupled, or bonded to the adjustment screw abutment surface 172.

The repulsion of the magnetic shock absorbing buffer system 100 can be adjusted. The distance between the static magnet 160 and the dynamic magnet 140 can be changed by rotating the adjustment screw 170 along the internal buffer threads 127. Moving the adjustment screw 170 further within the buffer element cavity 120 shortens the distance between the static magnet 160 and the dynamic magnet 140 and increase the repelling force, while moving the adjustment screw 170 out of the buffer element cavity 120 lengthens the distance between the static magnet 160 in the dynamic magnet 140 and decreases the repelling force, thereby allowing the magnetic shock absorbing buffer system 100 to accommodate for variables in the speed of the action and better function under different conditions.

Upon assembly, the magnetic shock absorbing buffer system 100 may optionally be charged with 1 drop of lubricating oil within the buffer element cavity 120. This is to swell optional O-rings and prevent abrasive friction and binding between moving plunger and magnets against the inner wall of the buffer element body portion 113.

If desired, the dimensions of the magnetic shock absorbing buffer system 100 allow for the internal components to be removed and replaced with inert weighted materials. This would essentially convert the magnetic shock absorbing buffer system 100 back into a traditional buffer assembly with no inherent recoil reduction mechanisms, albeit the magnetic shock absorbing buffer system 100 would retain the ability to have its weight adjusted without removal from the firearm and without special tools or skills.

The magnetic shock absorbing buffer system 100 can be built into a bolt carrier group as an extension of the bolt carrier group, or supplemented by simply installing an opposing magnet into the rear of the bolt carrier group in addition to the magnetic shock absorbing buffer system 100.

The assembled magnetic shock absorbing buffer system 100 can then be utilized in conjunction with a known recoil spring 1, as a replacement for a known buffer 3.

During a firing cycle, as the magnetic shock absorbing buffer system 100 moves inside of the recoil spring, the static magnet 160 and the dynamic magnet 140 pulling against it create a "magnetic friction braking" effect.

The assembled magnetic shock absorbing buffer system 100 does not readily reject air inside of the buffer system 100 assembly, supplementing a compressed air cushion that is stronger the faster the buffer is traveling when the plunger is initially engaged.

The magnetic shock absorbing buffer system 100 optionally provides an adjust the cyclic rate of fully automatic firearms, or "machine guns", by speeding up the forward reciprocation of the bolt group action.

Figure 14:
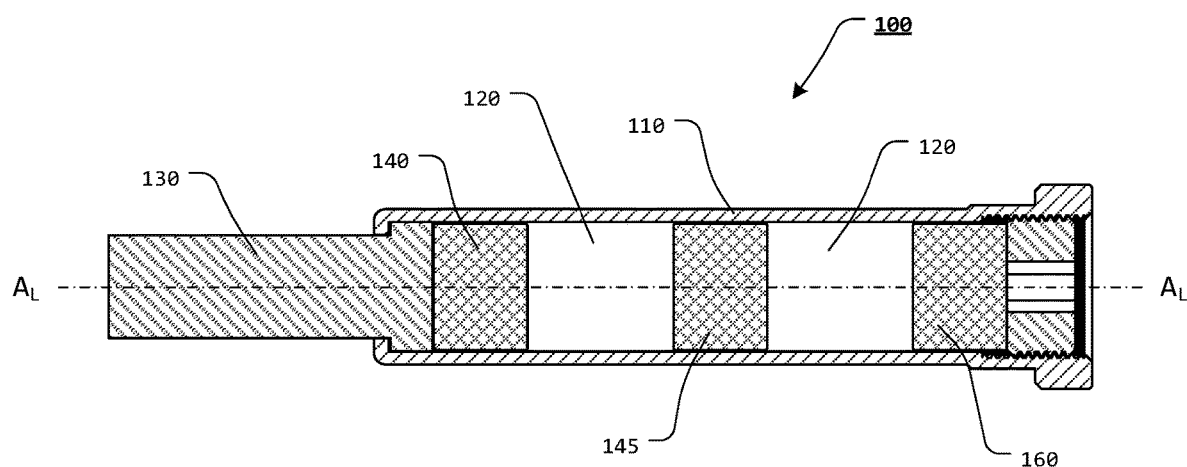
FIG. 14 illustrates a side, cross-sectional view of an exemplary embodiment of a magnetic shock absorbing buffer system, according to the presently disclosed systems, methods, and/or apparatuses.
Figure 15:
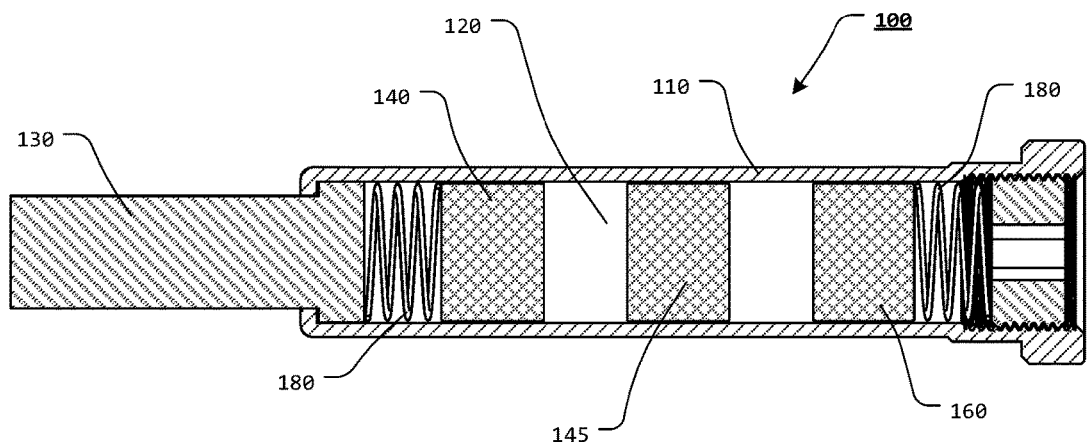
FIG. 15 illustrates a side, partially transparent view of an exemplary embodiment of a magnetic shock absorbing buffer system, according to the presently disclosed systems, methods, and/or apparatuses.
Figure 16:
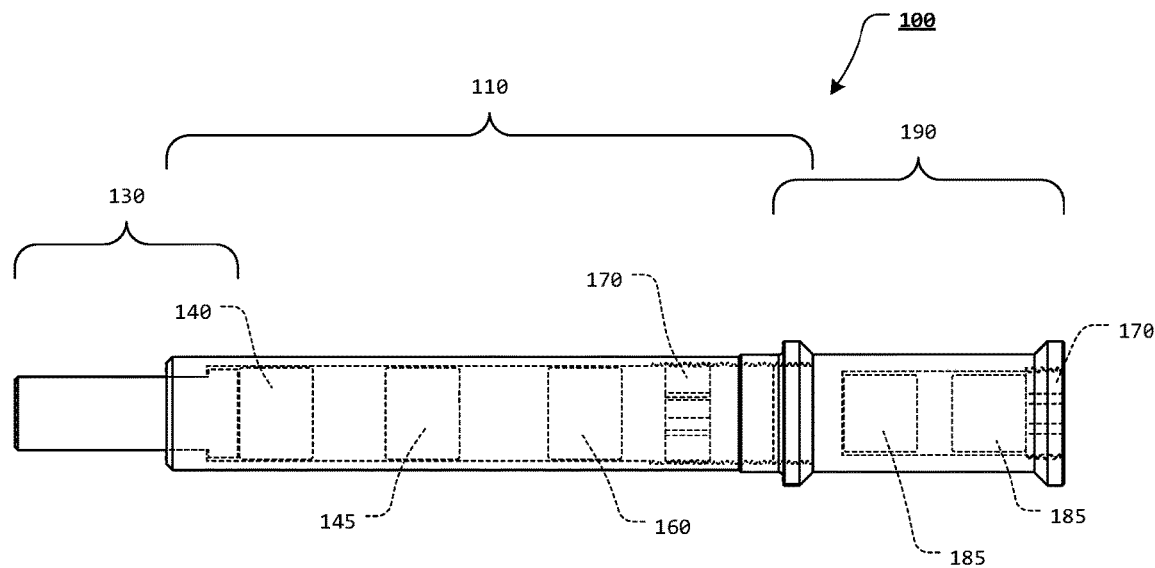
FIG. 16 illustrates a side, partially transparent view of an exemplary embodiment of a magnetic shock absorbing buffer system, according to the presently disclosed systems, methods, and/or apparatuses.
Figure 17:
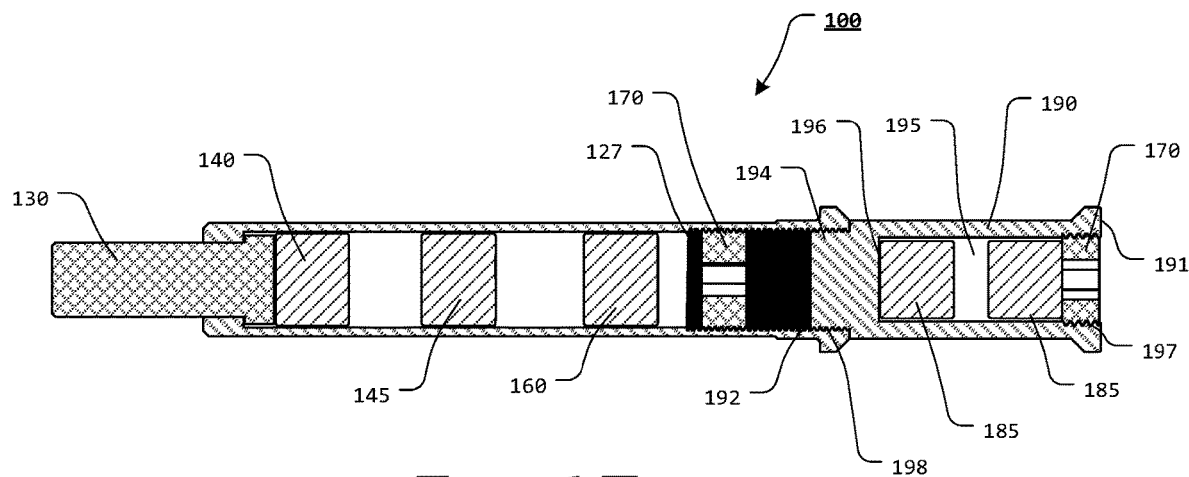
FIG. 17 illustrates a side, cross-sectional view of an exemplary embodiment of a magnetic shock absorbing buffer system, according to the presently disclosed systems, methods, and/or apparatuses.
Figure 18:
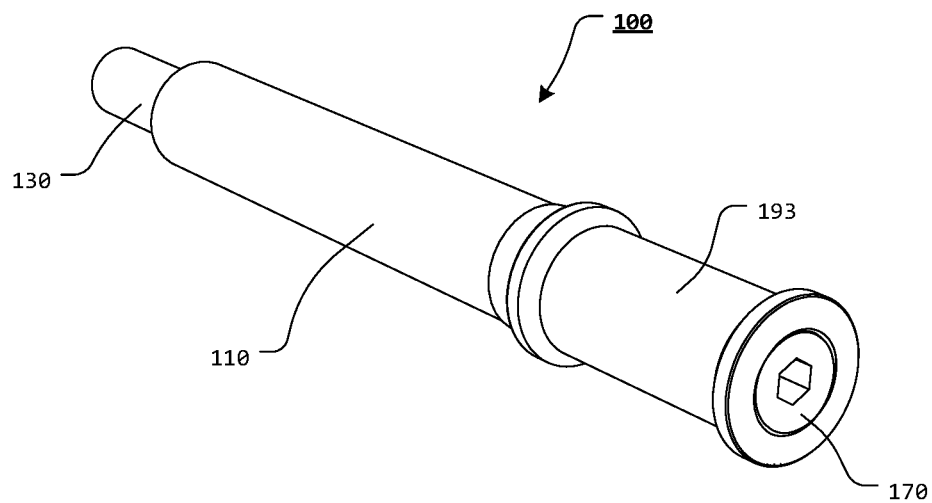
FIG. 18 illustrates a perspective view of an exemplary embodiment of a magnetic shock absorbing buffer system, according to the presently disclosed systems, methods, and/or apparatuses.
Figure 19:
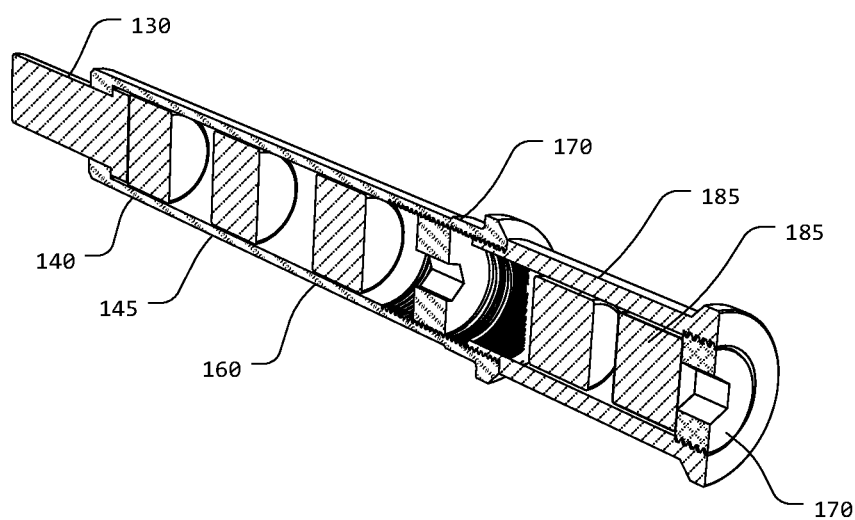
FIG. 19 illustrates a side, cross-sectional, perspective view of an exemplary embodiment of a magnetic shock absorbing buffer system, according to the presently disclosed systems, methods, and/or apparatuses.

As illustrated in FIGS. 14-15, an additional, supplemental dynamic magnet 145 may be positioned within the buffer element cavity 120. In these exemplary embodiments, the dynamic magnet 140, the supplemental dynamic magnet 145, and the static magnet 160 are positioned within the buffer element cavity 120 such that like poles (i.e., north poles or south poles) of adjacent magnets face one another (i.e., two north poles or two south poles are oriented toward each other) and each magnet works to repel each other adjacent magnet within the buffer element cavity 120.

As illustrated in FIG. 15, a buffer spring 180 is optionally positioned between the plunger proximal end 131 and the dynamic magnet 140 and/or a buffer spring 180 is optionally positioned between the adjustment screw abutment surface 172 and the static magnet 160. In this manner, additional spring bias is provided to resist compressional forces on the plunger element 130, relative to the buffer element 110.

As illustrated in FIGS. 16-19, a buffer extension element 190 is included. In various exemplary embodiments, the buffer extension element 190 comprises a buffer extension element body 193 having a buffer extension element cavity 195. The buffer extension element 190 comprises an elongate portion of material extending, along a longitudinal axis $A_L$, from a buffer extension element first end 191 to a buffer extension element second end 192.

In various exemplary embodiments, the buffer extension element 190 includes a buffer extension element cavity 195, extending from the buffer extension element first end 191 and defined by one or more side walls and a buffer extension element bottom wall 196. At least a portion of the buffer extension element cavity 195, extending from the buffer extension element first end 191, includes internal buffer extension element threads 197. The internal buffer extension element threads 197 correspond to external adjustment screw threads 177 of an adjustment screw 170.

In various exemplary, nonlimiting embodiments, the buffer extension element cavity 195 is formed so as to allow one or more weight elements 185 to be positioned therein. If the weight elements 185 are positioned within the buffer extension element cavity 195, the adjustment screw 170 can be threadedly attached or coupled to the buffer extension element 190, via interaction of the internal threads of the internal buffer extension element threads 197 and the external adjustment screw threads 177 of the adjustment screw 170. In this manner, the weight elements 185 are maintained within the buffer extension element cavity 195.

A buffer extension element attachment extension 194 extends from the buffer extension element second end 192 and includes at least some buffer extension element external threads 198. The buffer extension element external threads 198 of the buffer extension element attachment extension 194 correspond to the internal buffer threads 127 of the buffer element 110, such that interaction between the buffer extension element external threads 198 of the buffer extension element attachment extension 194 and the internal threads of the internal buffer threads 127 allow the buffer extension element 190 to be releasably threadedly attached or coupled to the buffer element 110. This embodiment allows additional weight to be added to the magnetic shock absorbing buffer system 100, if desired.

In various exemplary embodiments, each weight element 185 is generally cylindrical in shape. The actual weight of each weight element 185 can vary, depending upon the desired functionality of the weight element 185 and the overall functional weight of the magnetic shock absorbing buffer system 100. In various exemplary embodiments, the weight element 185 may comprise a portion of stainless steel or tungsten rod.

Figure 20:
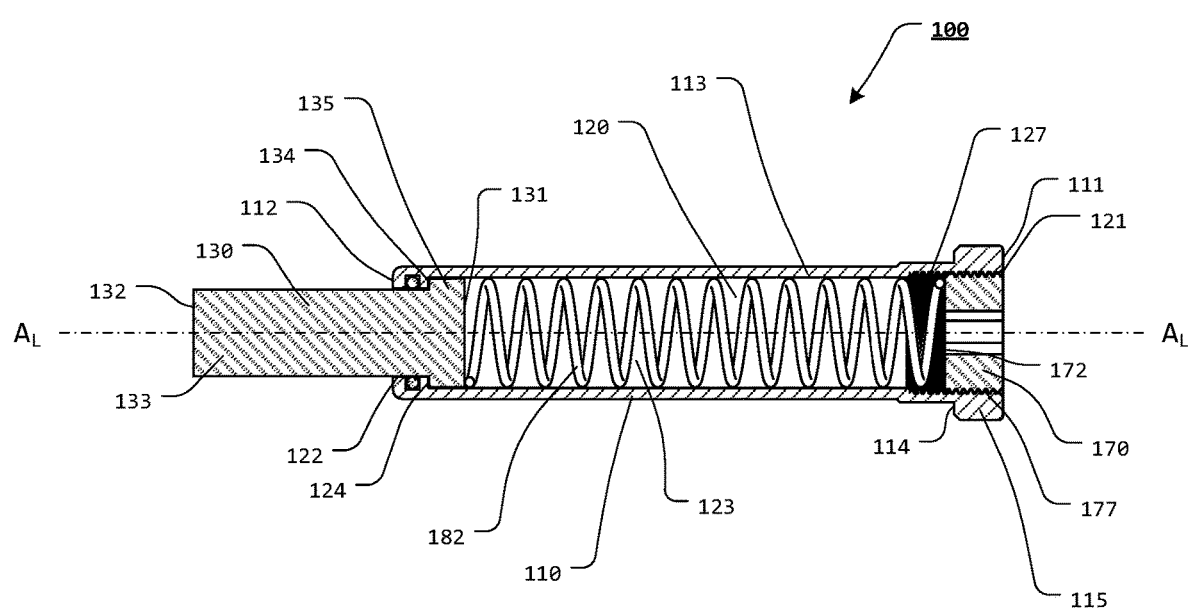
FIG. 20 illustrates a side, cross-sectional, perspective view of an exemplary embodiment of a shock absorbing buffer system, according to the presently disclosed systems, methods, and/or apparatuses.
Figure 21:
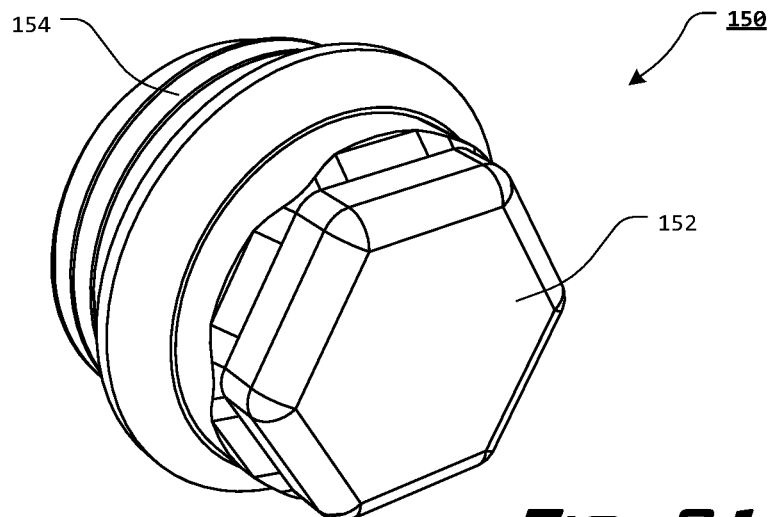
FIG. 21 illustrates a front perspective view of an exemplary embodiment of an anti-tilt cap, according to the presently disclosed systems, methods, and/or apparatuses.
Figure 22:
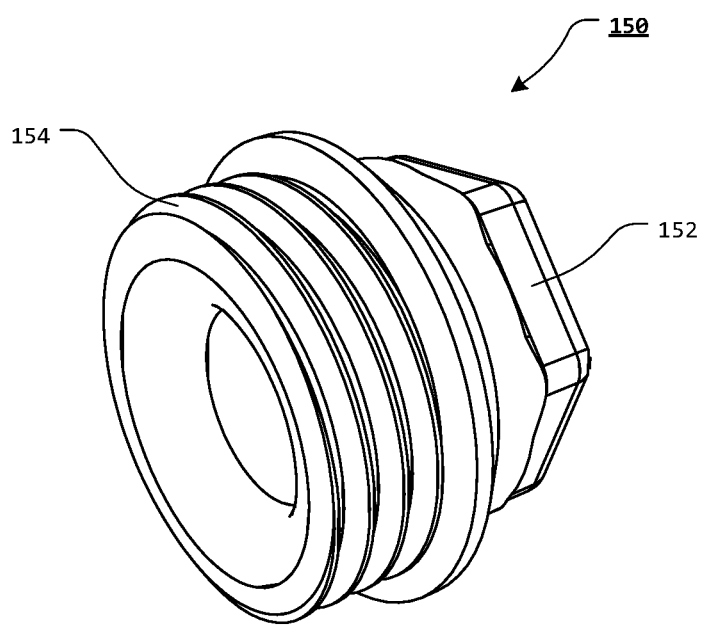
FIG. 22 illustrates a rear perspective view of an exemplary embodiment of an anti-tilt cap, according to the presently disclosed systems, methods, and/or apparatuses.
Figure 23:
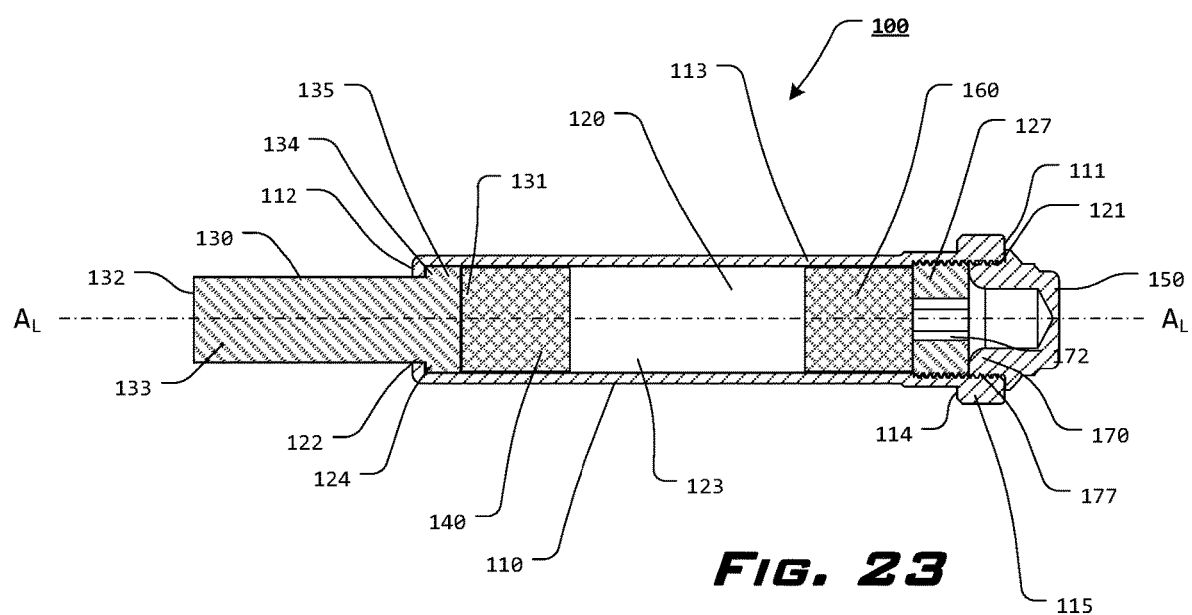
FIG. 23 illustrates a side, cross-sectional, perspective view of an exemplary embodiment of a magnetic shock absorbing buffer system with an anti-tilt cap, according to the presently disclosed systems, methods, and/or apparatuses.

As illustrated in FIG. 20, the dynamic magnet 140, the supplemental dynamic magnet 145, and the static magnet 160 are removed and replaced with a buffer compression spring 182. The buffer compression spring 182 is positioned between the plunger proximal end 131 the adjustment screw abutment surface 172. The degree of biasing force provided by the buffer compression spring 182 may be adjusted, by adjusting the position of the adjustment screw 170 within the buffer element cavity 120, as described herein.

As illustrated, for example, in FIGS. 21-24, the magnetic shock absorbing buffer system 100 may optionally be utilized in connection with an anti-tilt cap 150, so as to allow the magnetic shock absorbing buffer system 100 to interact with a bolt carrier group. The anti-tilt cap 150 includes a screw portion 152 and a threaded portion 154. The external threads of the threaded portion 154 are formed so as to allow interaction between the threaded portion 154 of the anti-tilt cap 150 and the internal buffer threads 127 of the buffer element 110, to allow the anti-tilt cap 150 to be threadedly attached or coupled to the buffer element 110 so as to extend from the buffer cavity first open end 121 of the buffer first end 111.

The screw portion 152 may optionally be formed of a hexagonal bolt face transitioning into a cylinder and forcing cone. However, it should be appreciated that the cross-sectional shape of the screw portion 152 is a design choice. The screw portion 152 is sized and shaped so as to be at least partially received within at least a portion of the inside diameter of a bolt carrier recess 95 of the bolt carrier 90.

When assembled, the anti-tilt cap 150 interfaces with the rear of the bolt carrier 90 and locks the two assemblies into a concentric axis of travel. This prevents the rear of the bolt carrier 90 from tilting or wobbling under operation, improving consistency of cycling and reducing shear forces against mechanical sliding surfaces.

Figure 24:
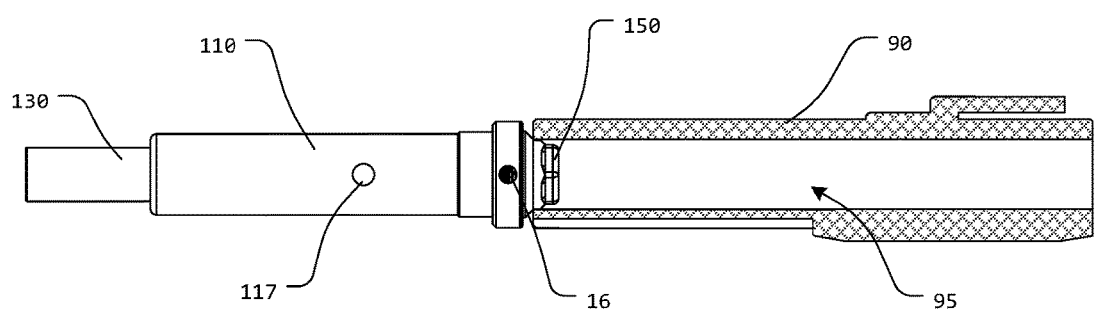
FIG. 24 illustrates a side, cross-sectional, perspective view of an exemplary embodiment of a magnetic shock absorbing buffer system with an anti-tilt cap, positioned at least partially within an exemplary bolt carrier, according to the presently disclosed systems, methods, and/or apparatuses.

As further illustrated in, for example, FIG. 24, one or more equalizing apertures 117 may be formed through a portion of the buffer element body portion 113, providing fluid communication between an exterior of the buffer element 110 and the buffer element cavity 120. In this manner, gases or fluids may be able to more easily escape from the buffer element cavity 120, during the cycling of the magnetic shock absorbing buffer system 100.

As further illustrated in FIG. 24, at least one optional lock screw aperture 116 may also be formed through a portion of the buffer element body portion 113. In various exemplary embodiments, the at least one optional lock screw element 116 is at least partially internally threaded, so as to allow a lock screw to be threadedly attached there in. If utilized, the lock screw can be used to further secure the anti-tilt cap 150 relative to the buffer element 110.

Figure 25:
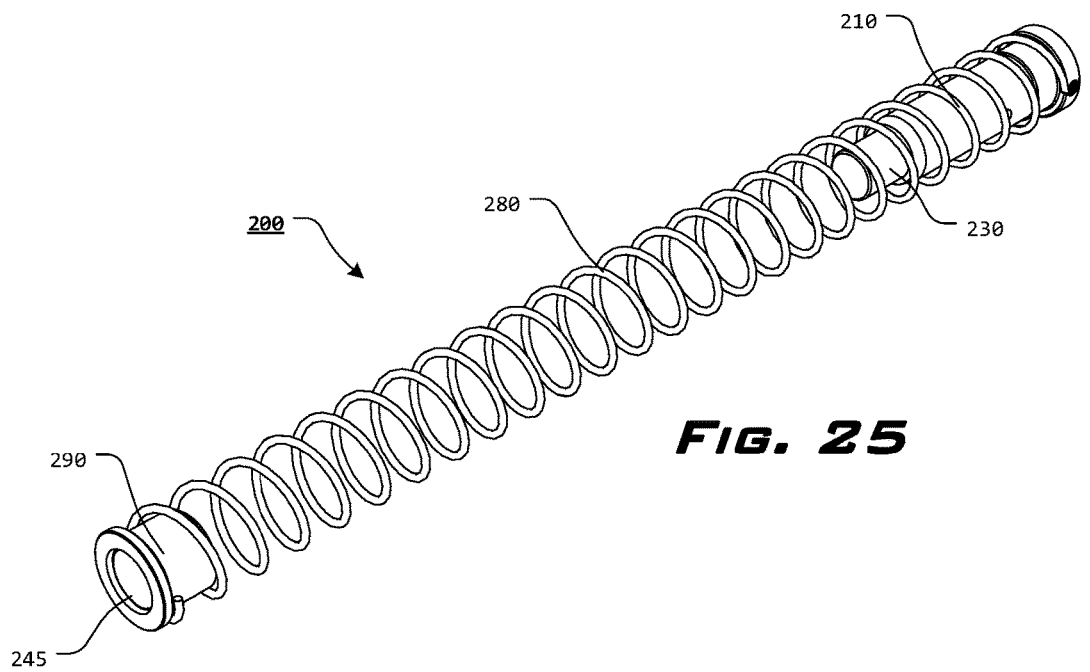
FIG. 25 illustrates a side, perspective view of an exemplary embodiment of a magnetic shock absorbing buffer system, according to the presently disclosed systems, methods, and/or apparatuses.
Figure 26:
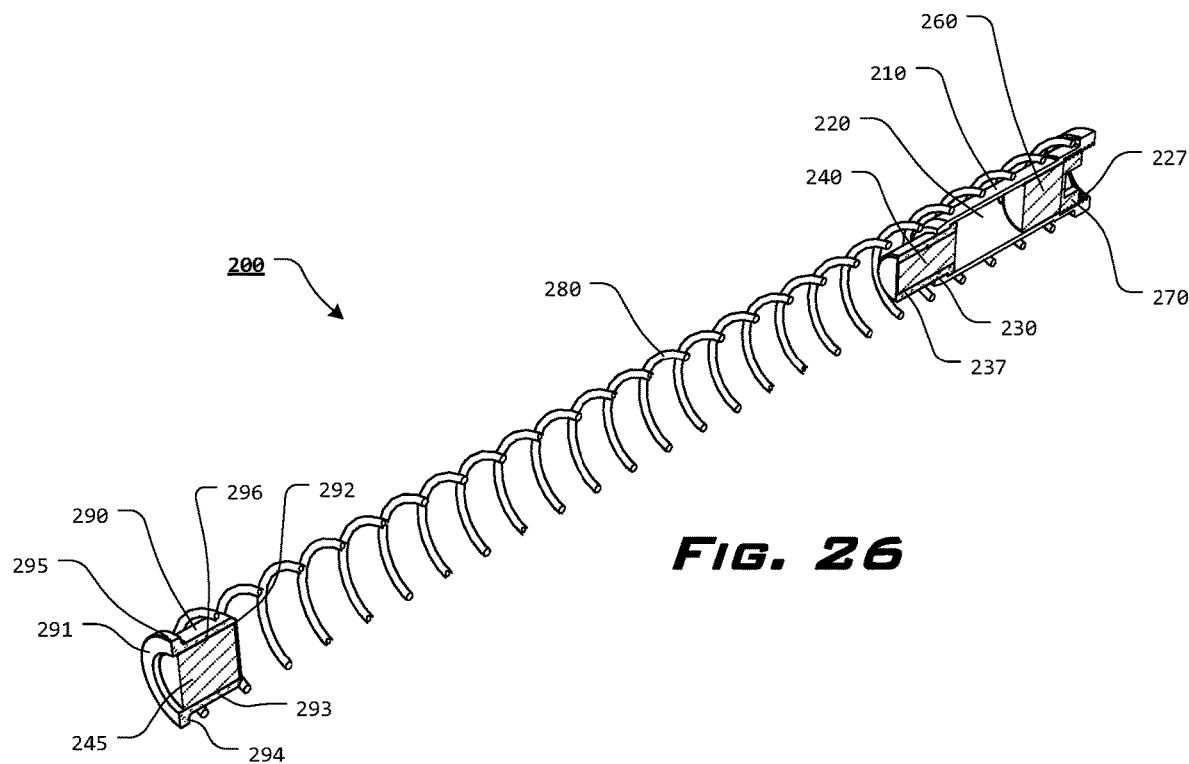
FIG. 26 illustrates a side, cross-sectional, perspective view of the exemplary embodiment of a magnetic shock absorbing buffer system of FIG. 25, according to the presently disclosed systems, methods, and/or apparatuses.

FIGS. 25-26 illustrate and exemplary embodiment of a magnetic shock absorbing buffer system 200. The magnetic shock absorbing buffer system 200 includes at least some of a buffer element 210 having a buffer element cavity 220, a plunger element 230, one or more static magnets 260, and an adjustment screw 270.

It should be appreciated that these elements correspond to and operate similarly to the buffer element 110, the buffer element cavity 120, the plunger element 130, the one or more static magnets 160, and the adjustment screw 170, as described, with reference to the magnetic shock absorbing buffer system 100.

However, as illustrated in FIGS. 25-26, the plunger element 230 includes a plunger element cavity 237 shaped so as to receive at least a portion of a dynamic magnet 240 therein.

The magnetic shock absorbing buffer system 200 comprises an elongate portion of material extending, along a longitudinal axis $A_L$, from a supplemental buffer first end 291 to a supplemental buffer second end 292. The supplemental buffer element 290 is formed of a supplemental buffer element body portion 293 and a supplemental buffer element head 295. In various exemplary embodiments, the supplemental buffer element body portion 293 optionally comprises a generally cylindrical overall shape.

The supplemental buffer element 290 includes a supplemental buffer element cavity 296 defined by one or more supplemental buffer cavity side walls.

The supplemental buffer element body portion 293 extends from the supplemental buffer second end 292 to a bulbous portion or supplemental buffer element head 295. The supplemental buffer element head 295 has a larger outer diameter than an outer diameter of the remainder of the supplemental buffer element body portion 293. A supplemental buffer shoulder 294 is formed as a transitional edge or plane between the supplemental buffer element head 295 and the outer surface of the supplemental buffer element body portion 293. The supplemental buffer element body portion 293 is formed such that at least a portion of the supplemental buffer element body portion 293 is positionable within a recoil spring 280. The supplemental buffer shoulder 294 extends from the supplemental buffer element body portion 293 so as to allow a terminal end of a recoil spring 280 to be abutted against the supplemental buffer shoulder 294.

The supplemental buffer shoulder 294 is formed proximate the supplemental buffer first end 291. The supplemental buffer shoulder 294 extends into at least a portion of the supplemental buffer element cavity 296, such that the supplemental buffer second end 292 has a reduced external diameter when compared to an external diameter of the supplemental buffer first end 291. In this manner, a terminal end of a recoil spring 280 is able to be abutted against the supplemental buffer shoulder 294.

A supplemental dynamic magnet 245 may be positioned within the supplemental buffer element cavity 296. In these exemplary embodiments, the dynamic magnet 240 and the supplemental dynamic magnet 245 are positioned within the such that like poles (i.e., north poles or south poles) of adjacent magnets face one another (i.e., two north poles or two south poles are oriented toward each other) and each magnet works to repel each other adjacent magnet of the supplemental buffer element 290.

The buffer element 210 contains all claims of the buffer element 110 and may be full size or miniaturized in order to have the same overall length at full compression when complimented by the supplemental buffer element 290. The supplemental dynamic magnet 245 usually in front of the plunger element 230 may optionally be embedded into the plunger element 230.

The supplemental buffer element 290 may be completely solid or feature an embedded magnet. When the embedded magnet in the supplemental buffer element 290 is an opposition to the buffer element 210, additional recoil dampening may be achieved, along with faster cycling and fire rate on the return stroke.

If the supplemental dynamic magnet 245 is flipped to impart an attractive force, this may slow forward motion and cycling rate and slow down the firing mechanism of automatic firearms. A similar effect may be achieved by simply producing the supplemental buffer element 290 from solid ferrous material.

In practice, this assembly may function in either direction/orientation. The supplemental buffer element 290 can be set behind the fire control group instead of the adjustable buffer element 210. The supplemental buffer element 290 being smaller and lighter consequently results in a lower reciprocating mass during firearm bolt carrier movement, potentially reducing recoil and/or increasing firing rate.

The size/length of the mini-supplemental buffer element 290 may change respectively to one-another to maintain the optimal length of stroke for different buffer tubes, firearms receivers, caliber, etc.

Figure 27:
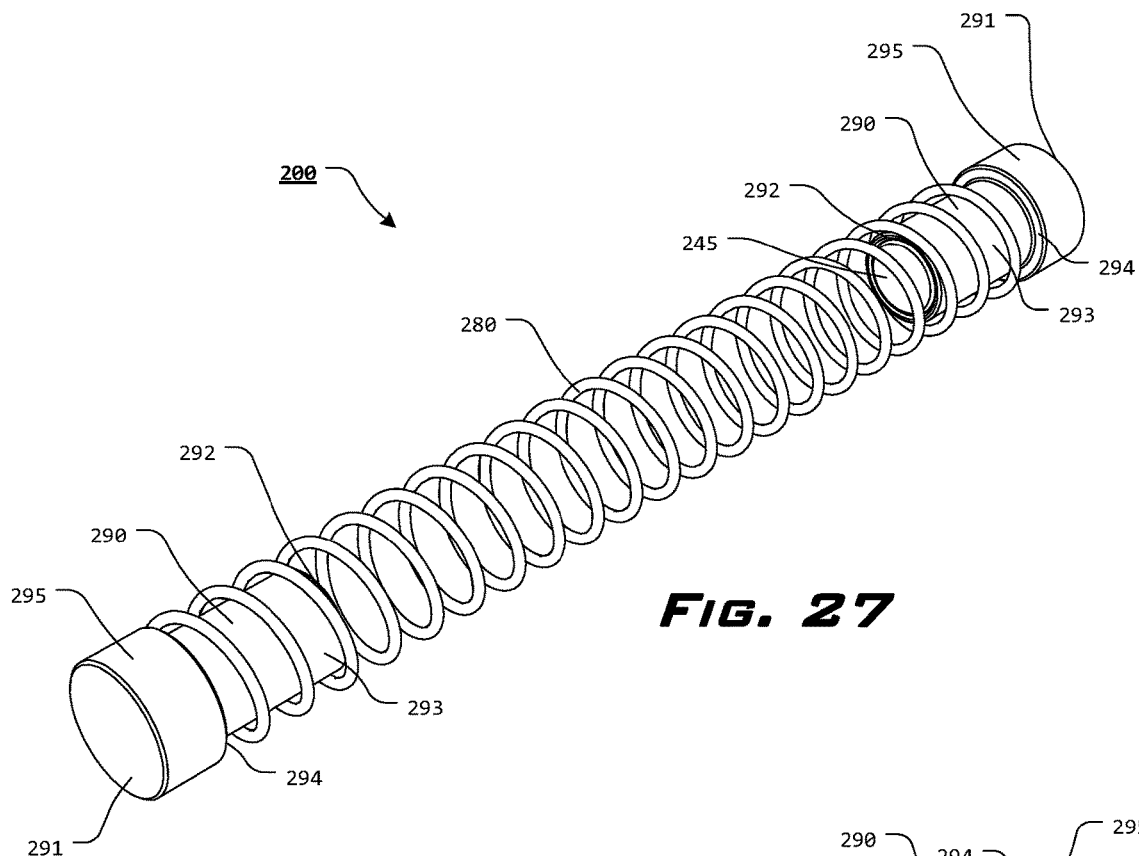
FIG. 27 illustrates a side, perspective view of an exemplary embodiment of a magnetic shock absorbing buffer system, according to the presently disclosed systems, methods, and/or apparatuses.
Figure 28:
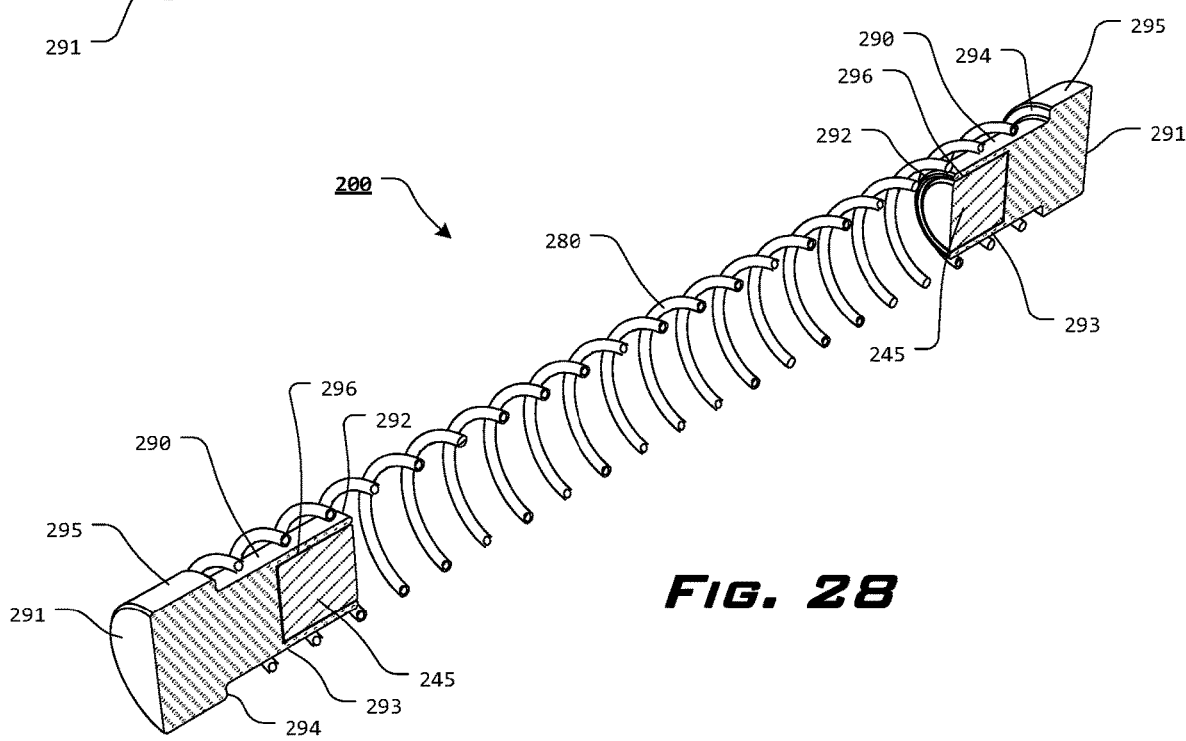
FIG. 28 illustrates a side, cross-sectional, perspective view of the exemplary embodiment of a magnetic shock absorbing buffer system of FIG. 27, according to the presently disclosed systems, methods, and/or apparatuses.

As illustrated in FIGS. 27-28, the elements of the magnetic shock absorbing buffer system 200 may optionally be altered. For example, the supplemental buffer element 290 may be altered, such that the supplemental buffer element head 295 is enlarged, the supplemental buffer element body portion 293 is extended, and the supplemental buffer element cavity 296 encompasses a greater degree of the supplemental dynamic magnet 245.

Additionally, opposing supplemental buffer elements 290 may optionally be positioned at opposing terminal ends of the recoil spring 280.

Figure 29:
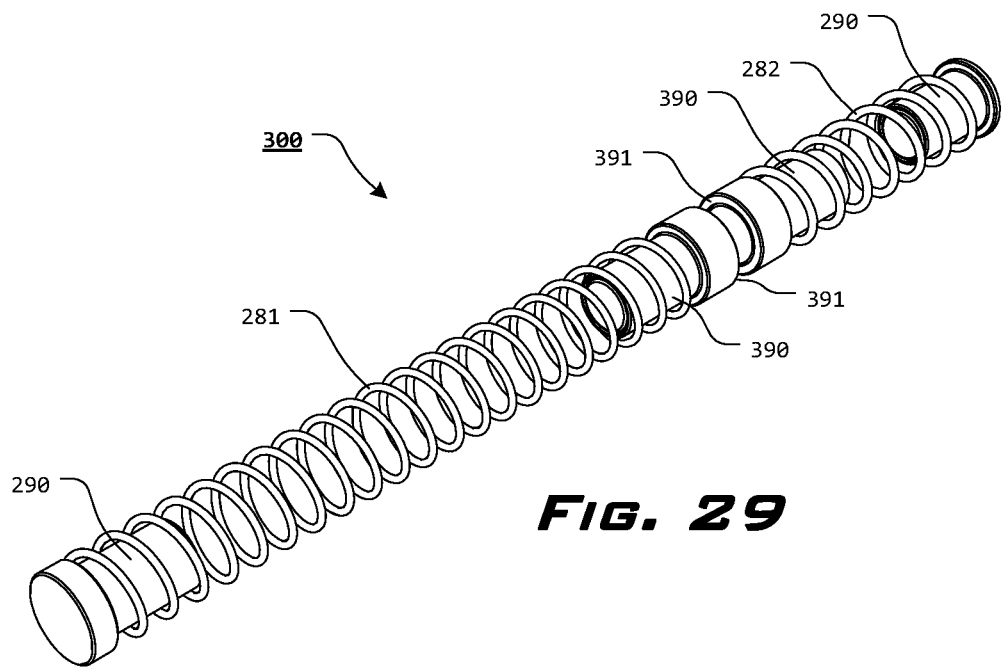
FIG. 29 illustrates a side, perspective view of an exemplary embodiment of a magnetic shock absorbing buffer system, according to the presently disclosed systems, methods, and/or apparatuses.
Figure 30:
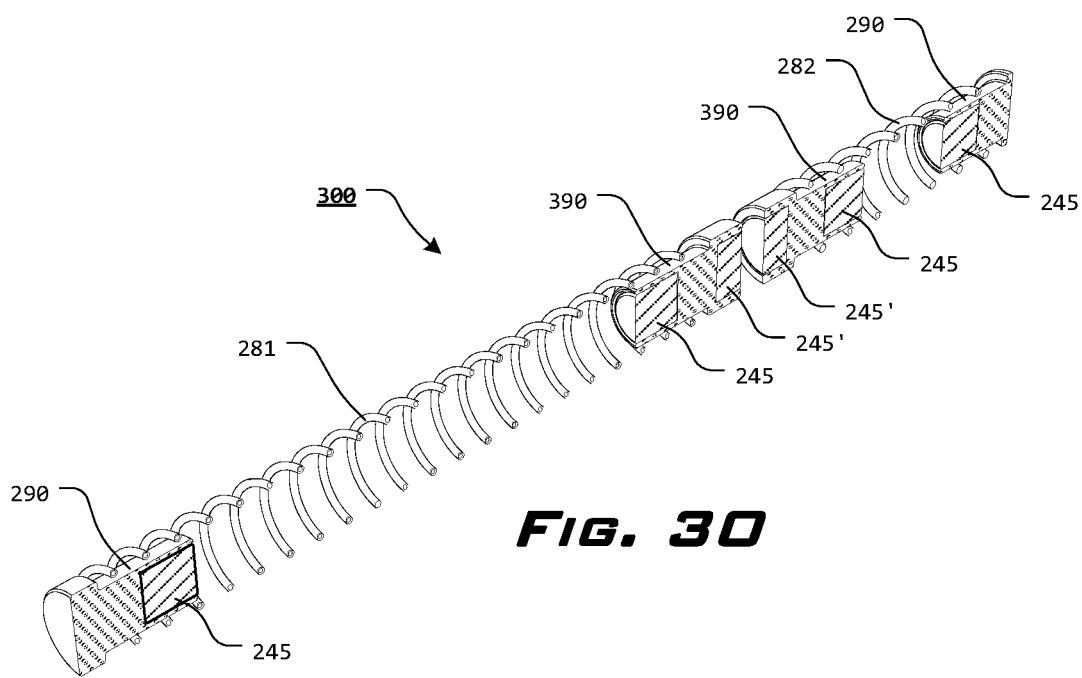
FIG. 30 illustrates a side, cross-sectional, perspective view of the exemplary embodiment of a magnetic shock absorbing buffer system of FIG. 29, according to the presently disclosed systems, methods, and/or apparatuses.

As illustrated in FIGS. 29-30, a magnetic shock absorbing buffer system 300 may optionally be utilized, which stacks magnetic shock absorbing buffer systems. As illustrated, the magnetic shock absorbing buffer system 300 replaces the recoil spring 280 with a primary recoil spring 281 and a secondary recoil spring 282 and utilizing two magnetic shock absorbing buffer system configurations, the first magnetic shock absorbing buffer system configuration utilizing the primary recoil spring 281 and the second magnetic shock absorbing buffer system configuration utilizing the secondary recoil spring 282.

Each magnetic shock absorbing buffer system configuration includes a supplemental buffer element 290 positioned proximate opposing terminal ends of the primary recoil spring 281 and the secondary recoil spring 282.

Supplemental buffer elements 390 are positioned proximate adjacent terminal ends of the primary recoil spring 281 and the secondary recoil spring 282. The supplemental buffer elements 390 are constructed substantially similar to the supplemental buffer elements 290. However, a supplemental dynamic magnet 245' is positioned at least partially within a cavity formed proximate the buffer extension element first end 391 of each supplemental buffer element 390.

In various exemplary embodiments, the adjacent supplemental dynamic magnets 245' may optionally be positioned so as to repel or attract one another, as described herein.

Figure 31:
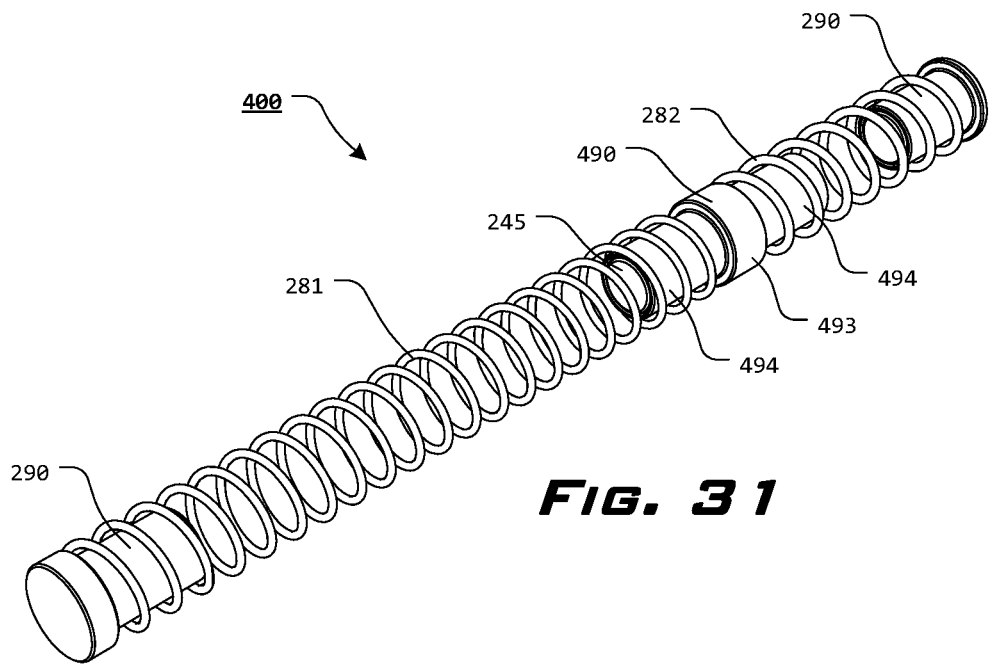
FIG. 31 illustrates a side, perspective view of an exemplary embodiment of a magnetic shock absorbing buffer system, according to the presently disclosed systems, methods, and/or apparatuses.
Figure 32:
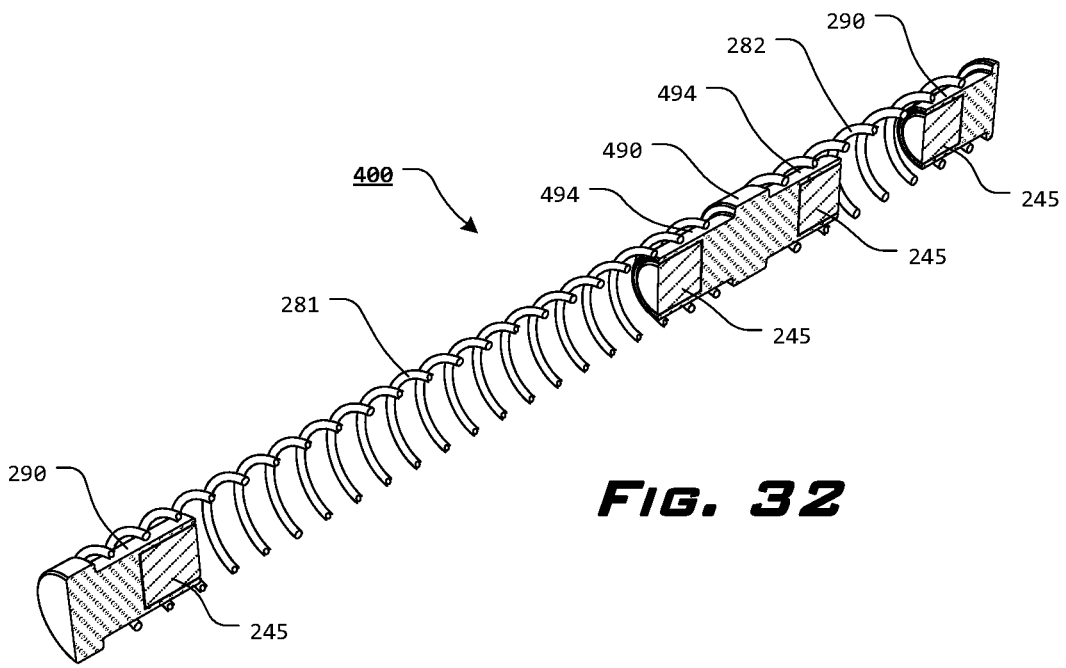
FIG. 32 illustrates a side, cross-sectional, perspective view of the exemplary embodiment of a magnetic shock absorbing buffer system of FIG. 31, according to the presently disclosed systems, methods, and/or apparatuses.

As illustrated in FIGS. 31-32, a magnetic shock absorbing buffer system 400 may optionally be utilized, which replaces the supplemental buffer elements 390 with the consolidated connector element 490, positioned between the primary recoil spring 281 and the secondary recoil spring 282. In various exemplary embodiments, the connector element 490 comprises a central body portion 493 and connector extension portions 494, which extend from opposing sides of the central body portion 493. Each connector extension portion 494 is configured so as to be at least partially positioned within at least a portion of the primary recoil spring 281 and/or the secondary recoil spring 282. A transition between each of the connector extension portions 494 and the central body portion 493 provides a shoulder, which allows a terminal end of the primary recoil spring 281 and/or the secondary recoil spring 282 to be abutted against each respective shoulder.

A supplemental dynamic magnet 245 is positioned within a cavity formed in each connector extension portion 494, proximate opposing, terminal ends of the connector element 490. During use of the magnetic shock absorbing buffer system 400, the supplemental dynamic magnets 245 positioned within portions of the connector extension portions 494 interact with the prospective, adjacent supplemental dynamic magnets 245 of the supplemental buffer elements 290.

It should be appreciated that adjustable and non-adjustable magnetic shock absorbent buffers may be stacked in succession, given a buffer tube of sufficient length is able to accommodate. This may be done ad-infinum in order to tune a system to exactly the desired travel length and shock dampening effect. Material density of each individual embed or strength of each section's spring are options as well.

It should also be appreciated that a more detailed explanation of the placement of the disclosed magnetic shock absorbing buffer systems within a lower receiver and certain other items and/or techniques necessary for the implementation and/or operation of the various exemplary embodiments of the present disclosure are not provided herein because such elements are commercially available and/or such background information will be known to one of ordinary skill in the art. Therefore, it is believed that the level of description provided herein is sufficient to enable one of ordinary skill in the art to understand and practice the present disclosure, as described.

While the presently disclosed systems, methods, and/or apparatuses have been described in conjunction with the exemplary embodiments outlined above, the foregoing description of exemplary embodiments of the present disclosure, as set forth above, are intended to be illustrative, not limiting and the fundamental systems, methods, and/or apparatuses should not be considered to be necessarily so constrained. It is evident that the systems, methods, and/or apparatuses are not limited to the particular variation or variations set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the presently disclosed systems, methods, and/or apparatuses. The upper and lower limits of these smaller ranges may independently be included in the smaller ranges and is also encompassed within the present disclosure, subject to any specifically excluded limit in the stated range. Where the stated range includes one or both of the limits, ranges excluding either or both of those included limits are also included in the present disclosure.

It is to be understood that the phraseology of terminology employed herein is for the purpose of description and not of limitation. Unless defined otherwise, all technical and scientific terms used herein have the same meaning as commonly understood by one of ordinary skill in the art to which the presently disclosed systems, methods, and/or apparatuses belong.

In addition, it is contemplated that any optional feature of the inventive variations described herein may be set forth and claimed independently, or in combination with any one or more of the features described herein.

Accordingly, the foregoing description of exemplary embodiments will reveal the general nature of the presently disclosed systems, methods, and/or apparatuses, such that others may, by applying current knowledge, change, vary, modify, and/or adapt these exemplary, non-limiting embodiments for various applications without departing from the spirit and scope of the present disclosure and elements or methods similar or equivalent to those described herein can be used in practicing the present disclosure. Any and all such changes, variations, modifications, and/or adaptations should and are intended to be comprehended within the meaning and range of equivalents of the disclosed exemplary embodiments and may be substituted without departing from the true spirit and scope of the presently disclosed systems, methods, and/or apparatuses.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A magnetic shock absorbing buffer system, comprising:
   a buffer element formed of a buffer element body portion and a buffer element head portion, wherein a buffer element cavity extends from a buffer cavity first open end to a buffer cavity second open end, wherein internal buffer threads are formed within a portion of said buffer cavity, extending from said buffer cavity first open end, and wherein a buffer cavity shoulder is formed proximate said buffer cavity second open end;
   a plunger element having a plunger head that extends from a plunger proximal end to a plunger shoulder and a plunger body that extends from said plunger shoulder to said plunger distal end, wherein said plunger head is slidable within at least a portion of said buffer element cavity, wherein said plunger body extends through said buffer cavity second open end, and wherein said plunger shoulder contacts or otherwise engages said buffer cavity shoulder to maintain said plunger head within said buffer element cavity;
   an adjustment screw that is at least partially externally threaded with external adjustment screw threads and extends to an adjustment screw abutment surface, wherein said external adjustment screw threads interact with said internal buffer threads to allow said adjustment screw to be adjustably positioned within said buffer cavity; and
   at least one dynamic magnet and at least one static magnet positioned within said buffer cavity, wherein said at least one dynamic magnet and said at least one static magnet are positioned within said buffer cavity such that like poles face one another such that said at him least one dynamic magnet and said at least one static magnet act to repel one another within said buffer cavity, and wherein said adjustment screw maintains said at least one dynamic magnet and said at least one static magnet within said buffer cavity.

2. The magnetic shock absorbing buffer system of claim 1, wherein said buffer body portion optionally comprises a generally cylindrical overall shape.

3. The magnetic shock absorbing buffer system of claim 1, wherein said buffer element cavity defined by one or more side walls.

4. The magnetic shock absorbing buffer system of claim 1, wherein said buffer cavity shoulder extends into at least a portion of said buffer cavity, such that said buffer cavity second open end has a reduced internal diameter when compared to an internal diameter of said buffer cavity first open end.

5. The magnetic shock absorbing buffer system of claim 1, wherein said adjustment screw comprises a threaded head plug.

6. The magnetic shock absorbing buffer system of claim 1, wherein said at least one dynamic magnet and said at least one static magnet are Rare Earth Neodymium designation N42 or higher.

7. The magnetic shock absorbing buffer system of claim 1, wherein said position of said adjustment screw relative to said buffer element cavity is adjustable to adjust a distance between said at least one dynamic magnet and said at least one static magnet within said buffer element cavity.

8. The magnetic shock absorbing buffer system of claim 1, further comprising an anti-tilt cap attached or coupled to said buffer element and extending from said buffer cavity first open end, wherein said anti-tilt cap extends from said buffer element so as to be at least partially received within at least a portion of a bolt carrier recess of a bolt carrier.

9. The magnetic shock absorbing buffer system of claim 1, wherein said buffer element head portion has a larger cross-sectional outer diameter than an outer cross-sectional diameter of said buffer element body portion.

10. The magnetic shock absorbing buffer system of claim 1, wherein a buffer shoulder is formed between said buffer element head portion and said buffer element body portion.

11. A magnetic shock absorbing buffer system, comprising:
 a buffer element having a buffer element cavity with internal buffer threads formed proximate a buffer cavity first open end and a buffer cavity shoulder formed proximate a buffer cavity second open end;
 a plunger element having a plunger head that extends from a plunger shoulder and a plunger body that extends from said plunger shoulder, wherein said plunger head is slidable within at least a portion of said buffer element cavity, wherein said plunger body extends through said buffer cavity second open end, and wherein said plunger shoulder contacts or otherwise engages said buffer cavity shoulder to maintain said plunger head within said buffer element cavity;
 an adjustment screw having external adjustment screw threads, wherein said external adjustment screw threads interact with said internal buffer threads to allow said adjustment screw to be adjustably positioned within a portion of said buffer cavity; and
 at least one dynamic magnet and at least one static magnet positioned within said buffer cavity, wherein like poles face one another such that said at least one dynamic magnet and said at least one static magnet act to repel one another within said buffer cavity, and wherein said adjustment screw maintains said at least one dynamic magnet and said at least one static magnet within said buffer cavity.

12. The magnetic shock absorbing buffer system of claim 11, wherein said buffer body portion optionally comprises a generally cylindrical overall shape.

13. The magnetic shock absorbing buffer system of claim 11, wherein said buffer cavity shoulder extends into at least a portion of said buffer cavity, such that said buffer cavity second open end has a reduced internal diameter when compared to an internal diameter of said buffer cavity first open end.

14. The magnetic shock absorbing buffer system of claim 11, wherein said adjustment screw comprises a threaded head plug.

15. The magnetic shock absorbing buffer system of claim 11, wherein said at least one dynamic magnet and said at least one static magnet are Rare Earth Neodymium designation N42 or higher.

16. The magnetic shock absorbing buffer system of claim 11, wherein said position of said adjustment screw relative to said buffer element cavity is adjustable to adjust a distance between said at least one dynamic magnet and said at least one static magnet within said buffer element cavity.

17. The magnetic shock absorbing buffer system of claim 11, further comprising an anti-tilt cap attached or coupled to said buffer element and extending from said buffer cavity first open end, wherein said anti-tilt cap extends from said buffer element so as to be at least partially received within at least a portion of a bolt carrier recess of a bolt carrier.

18. A magnetic shock absorbing buffer system, comprising:
 a buffer element extending from a buffer first end to a buffer second end, wherein a buffer element body portion extends from said buffer second end and a buffer element head portion extends from said buffer first end, wherein a buffer element cavity extends from a buffer cavity first open end to a buffer cavity second open end, wherein internal buffer threads are formed within a portion of said buffer cavity, extending from said buffer cavity first open end, and wherein a buffer cavity shoulder is formed proximate said buffer cavity second open end;
 a plunger element having a plunger head that extends from a plunger proximal end to a plunger shoulder and a plunger body that extends from said plunger shoulder to said plunger distal end, wherein said plunger head is slidable within at least a portion of said buffer element cavity, wherein said plunger body extends through said buffer cavity second open end, and wherein said plunger shoulder contacts or otherwise engages said buffer cavity shoulder to maintain said plunger head within said buffer element cavity;
 an adjustment screw that is at least partially externally threaded with external adjustment screw threads and extends to an adjustment screw abutment surface, wherein said external adjustment screw threads interact with said internal buffer threads to allow said adjustment screw to be adjustably positioned within said buffer cavity; and
 at least one dynamic magnet and at least one static magnet positioned within said buffer cavity, wherein said at least one dynamic magnet and said at least one static magnet are positioned within said buffer cavity such that like poles face one another such that said at him least one dynamic magnet and said at least one static magnet act to repel one another within said buffer cavity, and wherein said adjustment screw maintains said at least one dynamic magnet and said at least one static magnet within said buffer cavity.

19. The magnetic shock absorbing buffer system of claim 18, wherein said buffer element head portion has a larger cross-sectional outer diameter than an outer cross-sectional diameter of said buffer element body portion.

20. The magnetic shock absorbing buffer system of claim 18, wherein a buffer shoulder is formed between said buffer element head portion and said buffer element body portion.

* * * * *